United States Patent
Liu et al.

(10) Patent No.: US 11,172,521 B2
(45) Date of Patent: Nov. 9, 2021

(54) SYSTEM AND METHOD FOR MANAGEMENT OF SESSION INFORMATION IN DATA COMMUNICATION NETWORK

(71) Applicant: HUAWEI TECHNOLOGIES CO., LTD., Guangdong (CN)

(72) Inventors: Ruizhi Liu, Shenzhen (CN); Chunshan Xiong, Shenzhen (CN); Yizhuang Wu, Beijing (CN); Haiyang Sun, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/787,571

(22) Filed: Feb. 11, 2020

(65) Prior Publication Data

US 2020/0178321 A1    Jun. 4, 2020

Related U.S. Application Data

(63) Continuation of application No. PCT/CN2018/088903, filed on May 29, 2018.

(30) Foreign Application Priority Data

Aug. 11, 2017 (CN) .......................... 201710683732.9

(51) Int. Cl.
*H04W 76/10* (2018.01)
*H04W 8/04* (2009.01)
(Continued)

(52) U.S. Cl.
CPC ............ *H04W 76/10* (2018.02); *H04W 8/04* (2013.01); *H04W 8/08* (2013.01); *H04W 8/18* (2013.01); *H04W 28/0268* (2013.01)

(58) Field of Classification Search
CPC .......... H04W 4/60; H04W 4/70; H04W 4/02; H04W 4/021; H04W 4/027; H04W 4/029;
(Continued)

(56) References Cited

U.S. PATENT DOCUMENTS

| 10,798,761 B2* | 10/2020 | Baek et al. ........... H04W 76/12 |
| 2011/0087789 A1* | 4/2011 | Savolainen et al. .......... 709/228 |
| 2020/0275302 A1* | 8/2020 | Youn et al. ........ H04W 28/0268 |

FOREIGN PATENT DOCUMENTS

| CN | 106937362 A | 7/2017 |
| CN | 106982458 A | 7/2017 |
| WO | 2017063708 A1 | 4/2017 |

OTHER PUBLICATIONS

Qualcomm Incorporated, "TS 23.502: Completion of PDU session establishment authentication and alignment to SA3", SA WG2 Meeting #S2-122, S2-175166, XP051310152, San Jose Del Cabo, Mexico, Jun. 26-30 2017, 8 pages.
(Continued)

Primary Examiner — Meless N Zewdu
(74) Attorney, Agent, or Firm — Fish & Richardson P.C.

(57) ABSTRACT

The present disclosure relates to session information management methods. One example method includes sending, by a session management function (SMF) network element, identification information of a terminal device, a data network name (DNN), and slice information to a data management network element to request first subscription data that is of the terminal device and that is associated with the DNN and the slice information, where the slice information is used to identify a network slice served by the SMF network element, and receiving, by the SMF network element, the first subscription data from the data management network element.

21 Claims, 15 Drawing Sheets

(51) Int. Cl.
*H04W 8/08* (2009.01)
*H04W 8/18* (2009.01)
*H04W 28/02* (2009.01)

(58) Field of Classification Search
CPC ......... H04W 8/00; H04W 8/005; H04W 8/02;
H04W 8/04; H04W 8/06; H04W 8/08;
H04W 8/14; H04W 8/18; H04W 8/20;
H04W 8/24; H04W 8/26; H04W 16/14;
H04W 16/10; H04W 16/12; H04W 16/02;
H04W 16/04; H04W 16/06; H04W 28/00;
H04W 28/02; H04W 28/0268; H04W
28/0226; H04W 28/0273; H04W 28/0284;
H04W 28/0289; H04W 28/06; H04W
28/08; H04W 28/10; H04W 28/12; H04W
28/16; H04W 76/00; H04W 76/10; H04W
76/11; H04W 88/00; H04W 88/02; H04W
88/08; H04W 88/18; H04W 92/00; H04W
92/02; H04W 92/06; H04W 92/045;
H04W 92/04; H04W 92/24; H04W 60/00;
G06F 9/50; G06F 9/5061; G06F
2209/5015; G06F 2209/5016; G06F
3/1231; H04L 49/00; H04L 49/1538;
H04L 61/1511; H04L 61/3075; H04L
49/20
See application file for complete search history.

(56) References Cited

OTHER PUBLICATIONS

Huawei et al, "TS 23.501: Slice selection", SA WG2 Meeting #122, S2-174439, Cabo, Mexico, Jun. 26-30, 2017, 20 pages.
Ericsson, "Slice co-existence", SA WG2 Meeting #122, S2-175271, XP051310241, San Jose, Mexico, Jun. 26-30, 2017, 8 pages.
Huawei (editor), "Network Slice instance selection",SA WG2 Meeting #122, S2-175045, Cabo, Mexico, Jun. 26-30, 2017, 24 pages.
Huawei, HiSilicon, "TS 23502: Support of static IP", SA WG2 Meeting #122-Bis, S2-175636, XP051325486, Sophia Antipolis, France, Aug. 21-25, 2017, 7 pages.
Huawei et al., "Network Slice instance selection",SA WG2 Meeting #122,S2-175296, Cabo, Mexico, Jun. 26-30, 2017, 26 pages.
Huawei, HiSilicon, "TS 23501: Support of static IP", SA WG2 Meeting #122-Bis, S2-175635, XP051335109, Sophia Antipolis, France, Aug. 21-25, 2017, 6 pages.
Extended European Search Report issued in European Application No. 18844446.7 dated Jul. 14, 2020, 9 pages.
PCT International Search Report and Written Opinion in International Application No. PCT/CN2018/088,903, dated Aug. 16, 2018, 16 pages (With English Translation).
Motorola Mobility, Lenovo, "Corrections to PDU session establishment procedure," SA WG2 Meeting #120, S2-171948, Busan, South Korea, Mar. 26-31, 2017, 6 pages.
China Mobile, "Pseudo-CR on Network Slicing Requirement for 5GS," 3GPP TSG CT4 Meeting #77, C4-172195, Spokane, US; Apr. 3-7, 2017, 2 pages.
Office Action issued in Chinese Application No. 201710683732.9 dated Mar. 29, 2021, 17 pages.

* cited by examiner

SYSTEM AND METHOD FOR MANAGEMENT OF SESSION INFORMATION IN DATA COMMUNICATION NETWORK

CROSS-REFERENCE TO RELATED APPLICATIONS

This application is a continuation of International Application No. PCT/CN2018/088903, filed on May 29, 2018, which claims priority to Chinese Patent Application No. 201710683732.9, filed on Aug. 11, 2017. The disclosures of the aforementioned applications are hereby incorporated by reference in their entireties.

TECHNICAL FIELD

This application relates to the field of wireless communications technologies, and in particular, to a session information management method and an apparatus.

BACKGROUND

In the 5th generation (the 5th generation, 5G) communications era, hundreds of billions of internet of things devices access a network, and different types of application scenarios have different requirements on the network. In a network slicing technology, create a virtual independent logical network is created on a same network infrastructure, to provide mutually isolated network environments for different application scenarios, so that network functions and features can be customized in the different application scenarios based on respective requirements in the application scenarios, thereby ensuring requirements of different services.

In a 5G communications system, a unified data management (unified data management, UDM) network element is responsible for storing session context information and subscription data of user equipment (user equipment, UE). The UE may access one or more network slices. When the UE is connected to a same data network (data network, DN) through a plurality of slices of different types, if the UDM network element in the 5G communications system manages the subscription data of the UE at a granularity of a data network name (data network name, DNN) with reference to a home subscriber server (home subscriber server, HSS) in a 4th generation (the 4th generation, 4G) communications system network, the subscription data cannot meet different requirements of the slices, and isolation between the slices cannot be implemented.

SUMMARY

This application describes a session information management method and an apparatus.

According to an aspect, an embodiment of this application provides a session information management method. The method includes: sending, by a session management function SMF network element, identification information (for example, a SUPI) of a terminal device, a data network name DNN, and slice information to a data management network element, to request first subscription data that is of the terminal device and that is associated with the DNN and the slice information; and receiving, by the SMF network element, the first subscription data from the data management network element. The slice information is used to identify a network slice served by the SMF network element (for example, S-NSSAI, hS-NSSAI, or an NSI ID).

According to the solution, when the SMF network element requests subscription data of the terminal device from the data management network element, both the DNN and the slice information are provided. In this way, the data management network element may send the first subscription data associated with the DNN and the slice information to the requested SMF, thereby meeting a parameter requirement specific to the slice. In addition, the data management network element does not need to send subscription data associated with another slice to the SMF. This conforms to a principle of mutual isolation between slices, and also avoids signaling and resource waste.

In a possible design, the method further includes: sending, by the SMF network element, the identification information of the terminal device, SMF information, the DNN, and the slice information to the data management network element, to register the SMF network element with the data management network element. For example, the SMF information includes at least one of identification information of the SMF network element and address information of the SMF network element.

An objective of registering the SMF network element with the data management network element is as follows: When subscription data in the data management network element is updated, a related SMF network element may be determined based on the slice information and the DNN, and the updated subscription data may be notified to the SMF network element. Therefore, according to the solution, when subscription data in a UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

In a possible design, the method further includes: receiving, by the SMF network element, the identification information of the terminal device, second subscription data, the DNN, and the slice information from the data management network element; and updating the first subscription data associated with the DNN and the slice information to the second subscription data.

In a possible design, the method further includes: receiving, by the SMF network element, the identification information of the terminal device, the DNN, and the slice information from the data management network element; and deleting, from the SMF network element, the first subscription data that is of the terminal device and that is associated with the DNN and the slice information. Therefore, when the UDM determines that subscription data in the SMF needs to be deleted, the UDM may find, based on context information of the terminal device, the SMF corresponding to the subscription data, to instruct the SMF to delete the subscription data, and the UDM deletes the information related to the SMF from the context information of the terminal device. Therefore, a principle of mutual isolation between slices is met, and signaling and resource waste is avoided.

In a possible design, the method further includes: sending, by the SMF network element, the identification information of the terminal device, the DNN, and the slice information to the data management network element, to delete the SMF information associated with the DNN and the slice information. Therefore, after receiving the DNN and the slice information, the UDM may find, based on the context information of the terminal device, the SMF information corresponding to the DNN and the slice information, to delete the information related to the SMF from the context information of the terminal device. Therefore, a principle of mutual isolation between slices is met, and signaling and resource waste is avoided.

According to another aspect, this application further discloses a session information management method, including: sending, by an SMF network element, identification information of a terminal device, SMF information, a DNN, and slice information to a data management network element, to register the SMF network element with the data management network element. For example, the SMF information includes at least one of identification information of the SMF network element and address information of the SMF network element. An objective of registering the SMF network element with the data management network element is as follows: When subscription data in the data management network element is updated, a related SMF network element may be determined based on the slice information and the DNN, and the updated subscription data may be notified to the SMF network element. Therefore, according to the solution, when subscription data in a UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

In a possible design, the method further includes: receiving, by the SMF network element, the identification information of the terminal device, second subscription data, the DNN, and the slice information from the data management network element; and updating the first subscription data associated with the DNN and the slice information to the second subscription data.

In a possible design, the method further includes: receiving, by the SMF network element, the identification information of the terminal device, the DNN, and the slice information from the data management network element; and deleting, from the SMF network element, the first subscription data that is of the terminal device and that is associated with the DNN and the slice information. Therefore, when the UDM determines that subscription data in the SMF needs to be deleted, the UDM may find, based on context information of the terminal device, the SMF corresponding to the subscription data, to instruct the SMF to delete the subscription data, and the UDM deletes information related to the SMF from the context information of the terminal device. Therefore, a principle of mutual isolation between slices is met, and signaling and resource waste is avoided.

In a possible design, the method further includes: sending, by the SMF network element, the identification information of the terminal device, the DNN, and the slice information to the data management network element, to delete the SMF information associated with the DNN and the slice information. Therefore, after receiving the DNN and the slice information, the UDM may find, based on the context information of the terminal device, the SMF information corresponding to the DNN and the slice information, to delete the information related to the SMF from the context information of the terminal device. Therefore, a principle of mutual isolation between slices is met, and signaling and resource waste is avoided.

According to still another aspect, this application further discloses a session information management method, including: receiving, by a data management network element, identification information of a terminal device, a data network name DNN, and slice information from a session management function SMF network element that are used to request first subscription data that is of the terminal device and that is associated with the DNN and the slice information; and sending, by the data management network element, the first subscription data to the SMF network element. The slice information is used to identify a network slice served by the SMF network element (for example, S-NSSAI, hS-NSSAI, or an NSI ID).

According to the solution, when the SMF network element requests subscription data of the terminal device from the data management network element, both the DNN and the slice information are provided. In this way, the data management network element may send the first subscription data associated with the DNN and the slice information to the requested SMF, thereby meeting a parameter requirement specific to the slice. In addition, the data management network element does not need to send subscription data associated with another slice to the SMF. This conforms to a principle of mutual isolation between slices, and also avoids signaling and resource waste.

In a possible design, the method further includes: receiving, by the data management network element, the identification information of the terminal device, SMF information, the DNN, and the slice information from the SMF network element, to register the SMF network element with the data management network element; and storing, by the data management network element, the SMF information associated with the DNN and the slice information into context information of the terminal device. The SMF information includes at least one of identification information of the SMF network element and address information of the SMF network element.

An objective of registering the SMF network element with the data management network element is as follows: When subscription data in the data management network element is updated, a related SMF network element may be determined based on the slice information and the DNN, and the updated subscription data may be notified to the SMF network element. Therefore, according to the solution, when subscription data in a UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

In a possible design, the method further includes: updating, by the data management network element, the first subscription data of the terminal device to second subscription data; determining the DNN and the slice information that are associated with the first subscription data; and sending the identification information of the terminal device, the DNN, the slice information, and the second subscription data to the SMF network element associated with the DNN and the slice information.

In a possible design, the method further includes: deleting, by the data management network element, the first subscription data from the data management network element; deleting the SMF information from the context information of the terminal device; and sending the identification information of the terminal device, the DNN, and the slice information to the SMF network element. Therefore, when the UDM determines that subscription data in the SMF needs to be deleted, the UDM may find, based on context information of the terminal device, the SMF corresponding to the subscription data, to instruct the SMF to delete the subscription data, and the UDM deletes the information related to the SMF from the context information of the terminal device. Therefore, a principle of mutual isolation between slices is met, and signaling and resource waste is avoided.

In a possible design, the method further includes: receiving, by the data management network element, the identification information of the terminal device, the DNN, and the slice information from the SMF network element; and deleting, from the context information of the terminal device, the SMF information associated with the DNN and the slice information. Therefore, after receiving the DNN and the slice information, the UDM may find, based on the context information of the terminal device, the SMF information corresponding to the DNN and the slice information, to delete the information related to the SMF from the context information of the terminal device. Therefore, a principle of mutual isolation between slices is met, and signaling and resource waste is avoided.

According to still another aspect, this application further discloses a session information management method, including: receiving, by a data management network element, identification information of a terminal device, SMF information, a DNN, and slice information from an SMF network element, to register the SMF network element with the data management network element; and storing, by the data management network element, the SMF information associated with the DNN and the slice information into context information of the terminal device. The SMF information includes at least one of identification information of the SMF network element and address information of the SMF network element.

An objective of registering the SMF network element with the data management network element is as follows: When subscription data in the data management network element is updated, a related SMF network element may be determined based on the slice information and the DNN, and the updated subscription data may be notified to the SMF network element. Therefore, according to the solution, when subscription data in a UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

In a possible design, the method further includes: updating, by the data management network element, the first subscription data of the terminal device to second subscription data; determining the DNN and the slice information that are associated with the first subscription data; and sending the identification information of the terminal device, the DNN, the slice information, and the second subscription data to the SMF network element associated with the DNN and the slice information.

In a possible design, the method further includes: deleting, by the data management network element, the first subscription data from the data management network element; deleting the SMF information from the context information of the terminal device; and sending the identification information of the terminal device, the DNN, and the slice information to the SMF network element. Therefore, when the UDM determines that subscription data in the SMF needs to be deleted, the UDM may find, based on context information of the terminal device, the SMF corresponding to the subscription data, to instruct the SMF to delete the subscription data, and the UDM deletes information related to the SMF from the context information of the terminal device. Therefore, a principle of mutual isolation between slices is met, and signaling and resource waste is avoided.

In a possible design, the method further includes: receiving, by the data management network element, the identification information of the terminal device, the DNN, and the slice information from the SMF network element; and deleting, from the context information of the terminal device, the SMF information associated with the DNN and the slice information. Therefore, after receiving the DNN and the slice information, the UDM may find, based on the context information of the terminal device, the SMF information corresponding to the DNN and the slice information, to delete the information related to the SMF from the context information of the terminal device. Therefore, a principle of mutual isolation between slices is met, and signaling and resource waste is avoided.

In the foregoing aspects and possible designs, the slice information is used to identify a network slice accessed by the terminal device; or the slice information is used to identify a network slice served by the SMF network element in a home public land mobile network HPLMN. The first subscription data includes at least one of the following: a subscribed aggregate maximum bit rate AMBR, a subscribed quality of service QoS profile, a subscribed charging feature, a static internet protocol IP address or static IP prefix, and a session and service continuity SSC mode.

According to still another aspect, an embodiment of this application provides a session management function network element. The session management function entity has a function of implementing behavior of the session management function network element in the foregoing method. The function may be implemented by hardware, or implemented by hardware executing corresponding software. The hardware or software includes one or more modules corresponding to the function. In a possible design, a structure of the session management function network element includes a processor and a transceiver. The processor is configured to process a corresponding function performed by the session management function network element in the foregoing method. The transceiver is configured to implement communication between the session management function network element and an access and mobility management function network element/a data management network element. The session management function network element may further include a memory. The memory is configured to be coupled to the processor, and stores a program instruction and data that are necessary for the session management function entity.

According to still another aspect, an embodiment of this application provides a data management network element. The data management network element has a function of implementing behavior of the data management network element in the foregoing method. The function may be implemented by hardware, or implemented by hardware executing corresponding software. The hardware or software includes one or more modules corresponding to the function. In a possible design, a structure of the data management network element includes a processor and a transceiver. The processor is configured to process a corresponding function performed by the data management network element in the foregoing method. The transceiver is configured to implement communication between the data management network element and a session management function network element. The data management network element may further include a memory. The memory is configured to be coupled to the processor, and stores a program instruction and data that are necessary for the session management function entity.

According to still another aspect, an embodiment of this application provides a computer readable storage medium. The computer readable storage medium stores an instruction, and when the instruction runs on a computer, the computer is enabled to perform the method according to each of the foregoing aspects.

According to still another aspect, an embodiment of this application provides a computer program product including an instruction. When the computer program product runs on a computer, the computer is enabled to perform the method according to each of the foregoing aspects.

According to still another aspect, this application provides a chip system. The chip system includes a processor, configured to support the session management function network element or data management network element in implementing a function described in the foregoing method, for example, generating or processing information described in the foregoing method. In a possible design, the chip system further includes a memory. The memory is configured to store a program instruction and data that are necessary for a data sending device. The chip system may include a chip, or may include a chip and another discrete device.

BRIEF DESCRIPTION OF DRAWINGS

The following briefly describes the accompanying drawings required for describing the embodiments.

DESCRIPTION OF EMBODIMENTS

The following clearly describes the technical solutions in the embodiments of this application with reference to the accompanying drawings in the embodiments of this application.

Figure 1:
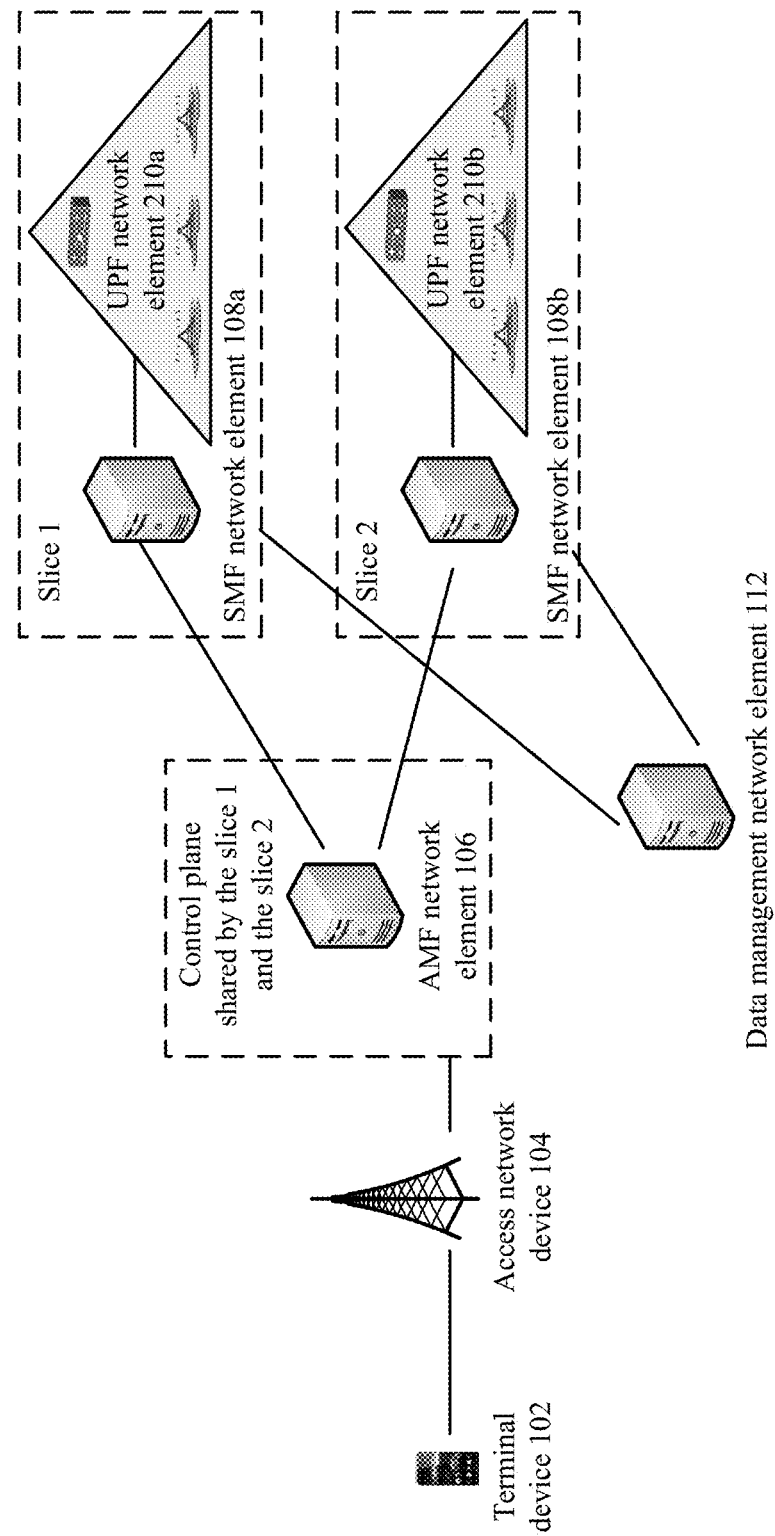
FIG. 1 is a schematic diagram of a communications system in a network slice-based non-roaming or local breakout (local breakout, LBO) scenario applicable to an embodiment of the present invention.

The embodiments of this application propose a solution based on a communications system shown in FIG. 1, and the solution is applicable to session information management in a next generation mobile network (for example, a 5G network) architecture. For example, in a 5G mobile network architecture, a control plane function and a forwarding plane function of a mobile gateway are decoupled. A separated control plane function and a conventional control network element such as an MME of the third generation partnership project (third generation partnership project, 3GPP) are integrated into a unified control plane (control plane) network element. A user plane UPF network element can implement user plane functions (SGW-U and PGW-U) of a serving gateway (serving gateway, SGW) and a packet data network gateway (packet data network gateway, PGW). Further, the unified control plane network element may be decomposed into an access and mobility management function (access and mobility management function, AMF) network element and a session management function (session management function, SMF) network element. The AMF network element may be responsible for attachment, mobility management, and a tracking area update procedure of a terminal device. The SMF network element may be responsible for session management of a terminal device, selection of a user plane device, reselection of a user plane device, internet protocol (internet protocol, IP) address allocation, quality of service (quality of service, QoS) control, session setup, modification, and release, and the like.

In addition, the embodiments of this application may be further applicable to another future-oriented communications technology. A system architecture and a service scenario described in the embodiments of this application are intended to describe the technical solutions in the embodiments of this application more clearly, and constitute no limitation on the technical solutions provided in the embodiments of this application. A person of ordinary skill in the art may know that as a network architecture evolves and a new service scenario emerges, the technical solutions provided in the embodiments of this application are also applicable to a similar technical problem.

As shown in FIG. 1, an embodiment of this application provides a network slice-based communications system. FIG. 1 is applicable to a non-roaming or LBO scenario. For example, the communications system includes at least a terminal device 102, an access network device 104, and a plurality of network slices, for example, a network slice 1 and a network slice 2. In the following description, "slice" is short for "network slice". In addition, each slice may also be referred to as a "slice instance (slice instance)" or a "network slice instance (network slice instance)". This is not limited herein in this application.

The terminal device 102 may access one slice or simultaneously access a plurality of slices. In an example of FIG. 1, the terminal device 102 simultaneously accesses the slice 1 and the slice 2. For example, the slice 1 is a slice of an enhanced mobile broadband (Enhanced Mobile Broadband, eMBB) type, and the slice 2 is a slice of an ultra-reliable and low-latency communication (Ultra-Reliable and Low-Latency Communication, URLLC) type. The slice 1 and the slice 2 may share a part of a control plane, which may also be referred to as a common control plane function (common control network function, CCNF). A control plane shared by the slice 1 and the slice 2 includes an AMF network element 106. In addition, a session management function is slice-specific, and this control function needs to be instantiated in a slice. To implement data route isolation, a user plane function also needs to be instantiated in a slice. In other words, the session management function and the user plane function are slice-specific, to implement a slice-specific service. In an example of FIG. 1, the slice 1 includes an SMF network element 108a and a user plane network element 210a, and the slice 2 includes an SMF network element 108b and a user plane network element 210b.

The terminal device (terminal device) 102 in this embodiment of this application may include various handheld devices, in-vehicle devices, wearable devices, or computing devices that have a wireless communication function, or another processing device connected to a wireless modem. The terminal device may also be referred to as user equipment (user equipment, UE), a mobile station (mobile station, MS), or a terminal (terminal), and may further include a subscriber unit (subscriber unit), a cellular phone (cellular phone), a smartphone (smart phone), a wireless data card, a personal digital assistant (personal digital assistant, PDA) computer, a tablet computer, a wireless modem (modem), a handheld (handheld) device, a laptop computer (laptop computer), a cordless phone (cordless phone), or a wireless local loop (wireless local loop, WLL) station, a machine type communication (machine type communication, MTC) terminal, or the like.

The access network device in this embodiment of this application is an apparatus that is deployed in a wired or wireless access network and that is configured to provide a wireless communication function for the terminal device 102. The access network device may include a base station in various forms, for example, a macro base station, a micro base station (also referred to as a small cell), a relay station, or an access point. In systems that use different radio access technologies, a device having a base station function may have different names. For example, the device is referred to as an evolved NodeB (evolved NodeB, eNB or eNodeB) in an LTE system; the device is referred to as a NodeB (Node B) in a 3rd generation (3rd generation, 3G) system; and the device is referred to as a gNB (gNodeB) in a new generation system.

The AMF network element in this embodiment of this application may be responsible for attachment, mobility management, and a tracking area update procedure of a terminal device. The AMF network element may also be referred to as an AMF device or an AMF entity. In an example of FIG. 1, only one AMF network element is shown. However, a quantity of AMF network elements is not limited in the present invention. Different AMF network elements may be connected to different slices, or may be connected to a same slice. The AMF network element may also be referred to as an AMF device or an AMF entity. For ease of description, the AMF network element is referred to as "AMF" for short below.

In an example of FIG. 1, the slice 1 and the slice 2 each include an SMF network element: the SMF network element 108a and the SMF network element 108b. The SMF network element in this embodiment of this application may be responsible for session management of a terminal device, selection of a user plane network element, reselection of a user plane network element, IP address allocation, QoS control, and session setup, modification, and release. The SMF network element may also be referred to as an SMF device or an SMF entity. For ease of description, the SMF network element is referred to as "SMF" for short below.

In addition, in an example of FIG. 1, the slice 1 and the slice 2 each include two UPF network elements: the UPF network element 210a and the UPF network element 210b. The UPF network element 210a and the UPF network element 210b may be connected to a same data network (data network, DN) or different data networks, to transmit data of a service. The UPF network element may also be referred to as a UPF device or a UPF entity.

The communications system further includes a data management device 112. The data management network element is configured to store subscription data of a user, for example, mobility management related subscription data and session management related subscription data. For example, the data management network element is a unified data management (unified data management, UDM) network element. The UDM network element may also be referred to as a UDM device or a UDM entity. For ease of description, the UDM network element is referred to as "UDM" for short below.

In the network slice-based communications system, the terminal device 102 may access one slice or simultaneously access a plurality of slices. The slices may provide different services. In addition, an operator may deploy a plurality of slices to provide a same service for different user groups. Different slices may be connected to a same DN.

A slice type may be identified by using single network slice selection assistance information (Single Network Slice Selection Assistance information, S-NSSAI). NSSAI is a S-NSSAI set. Each piece of S-NSSAI is used to assist a network in selecting an specific network slice instance. A same network slice instance may be selected by using different S-NSSAI.

In the following description of this application, slice information used to identify a slice may be at least one of identification information of the slice and type information of the slice, or may be other information that can identify the slice. For example, the identification information of the slice is a network slice instance identifier (a network slice instance ID or an NSI ID). The type information of the slice includes the S-NSSAI. The S-NSSAI includes a slice/service type (Slice/Service Type, SST). The SST is desired feature and service performance of a network slice. For example, a standardized SST includes an eMBB, URLLC, or a massive internet of things (massive internet of things, MIoT). Optionally, the S-NSSAI further includes a slice differentiator (Slice Differentiator, SD). The SD is optional information and is used to complement the SST to distinguish between a plurality of slices of a same SST type. In a possible implementation, the slice information used to identify a slice type may be an SST of the S-NSSAI. In another possible implementation, the slice information is a combination of the SST and the SD. For ease of description, the following embodiments are described by using an example in which the slice information is the S-NSSAI. However, this is not limited in the present invention.

Figure 2A:
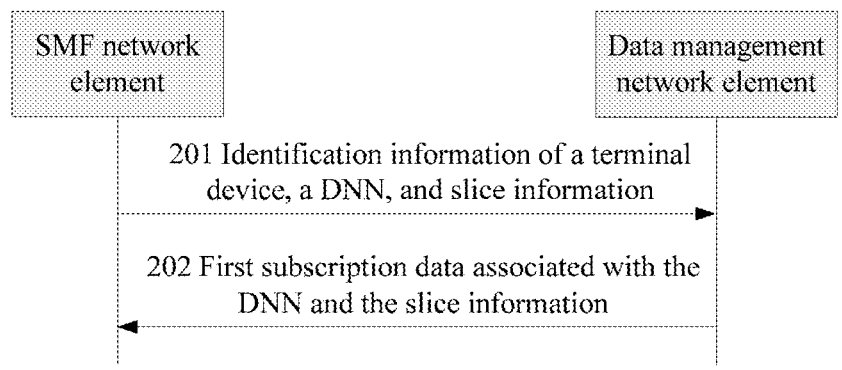
FIG. 2A and FIG. 2B are signaling interaction diagrams of a session information management method according to an embodiment of the present invention.
Figure 2B:
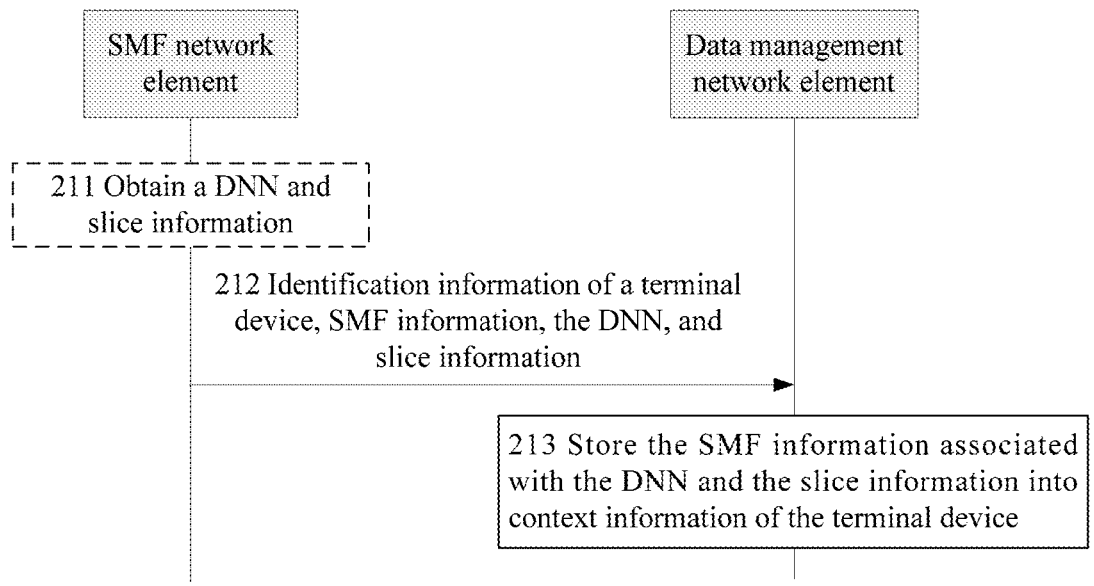

The present invention discloses a session information management method. Session information includes subscription data and session context information of UE. FIG. 2A and FIG. 2B describe the present invention respectively from a perspective of the subscription data and a perspective of the session context information of the UE.

FIG. 2A shows a session information management method according to an embodiment of the present invention. The method may be performed through interaction between an SMF network element (for example, the SMF network element 108a or 108b in FIG. 1) and a data management network element (for example, the data management network element 112 in FIG. 1). The method includes the following steps.

Step 201: The SMF network element sends identification information of a terminal device, a DNN, and slice information to the data management network element, to request first subscription data that is of the terminal device and that is associated with the DNN and the slice information.

Correspondingly, the data management network element receives the identification information of the terminal device, the DNN, and the slice information from the SMF network element.

The slice information is used to identify a network slice served by the SMF network element. In a non-roaming or LBO scenario, the slice served by the SMF network element is a slice accessed by the terminal device.

The identification information of the terminal device is a permanent ID of the terminal device, for example, a subscription permanent ID (subscriber permanent ID, SUPI).

For example, the SMF network element may request UE subscription data by invoking a network function (network function, NF) service of a UDM. A service for requesting the subscription data may be Nudm_Subscriber_Data_Get. For example, the service may be invoked by sending Nudm_Subscriber_Data_GetRequest, and Nudm_Subscriber_Data_GetRequest includes the identification information of the terminal device, the DNN, and the slice information. In other words, input for invoking the service includes the identification information of the terminal device, the DNN, and the slice information. Alternatively, the SMF may send, to the UDM, another request message carrying the identification information of the terminal device, the DNN, and the slice information, to request subscription data that is of the terminal device and that is associated with the DNN and the slice information.

After receiving the identification information of the terminal device, the DNN, and the slice information, the data management network element may search the subscription data of the terminal device for the first subscription data that is associated with the DNN and the slice information.

For example, the first subscription data includes at least one of the following: a subscribed aggregate maximum bit rate (aggregate maximum bit rate, AMBR), a subscribed QoS profile, a subscribed charging feature, a static IP address or static IP prefix, and a session and service continuity (session and service continuity, SSC) mode. The AMBR may be an AMBR of different granularities, such as an AMBR of a UE granularity, an AMBR of a session granularity, an AMBR of a DNN granularity, an AMBR of a slice granularity, or an AMBR of a DNN and slice granularity. This is not limited herein in the present invention. The static IP address or static IP prefix remains unchanged in comparison with a dynamically allocated IP address or IP prefix in the prior art.

For example, the data management network element stores the subscription data of the terminal device in a form of Table 1.

TABLE 1

| | | |
|---|---|---|
| Subscribed AMBR 1 | Slice 1 | DNN 1 |
| Subscribed QoS profile 1 | Slice 1 | DNN 1 |
| Subscribed charging feature 1 | Slice 1 | DNN 1 |
| Static IP address 1 | Slice 1 | DNN 1 |
| Subscribed AMBR 2 | Slice 2 | DNN 1 |
| Subscribed QoS profile 2 | Slice 2 | DNN 1 |
| Subscribed charging feature 2 | Slice 2 | DNN 1 |
| Static IP address 2 | Slice 2 | DNN 1 |
| Subscribed AMBR 3 | Slice 1 | DNN 2 |
| Subscribed QoS profile 3 | Slice 1 | DNN 2 |
| Subscribed charging feature 3 | Slice 1 | DNN 2 |
| Static IP address 3 | Slice 1 | DNN 2 |

As shown in Table 1, the data management network element stores subscription data associated with the slice 1 (for example, the slice 1 corresponds to S-NSSAI 1) and the DNN 1: the subscribed AMBR 1, the subscribed QoS profile 1, the subscribed charging feature 1, and the static IP address 1; subscription data associated with the slice 2 (for example, the slice 2 corresponds to S-NSSAI 2) and the DNN 1: the subscribed AMBR 2, the subscribed QoS profile 2, the subscribed charging feature 2, and the static IP address 2; and subscription data associated with the slice 1 and the DDN 2: the subscribed AMBR 3, the subscribed QoS profile 3, the subscribed charging feature 3, and the static IP address 3. Assuming that a DNN received by the data management network element is the DNN 1, and received slice information is the S-NSSAI 1 corresponding to the slice 1, first subscription data associated with the DNN 1 and the slice 1 includes at least one of the subscribed AMBR 1, the subscribed QoS profile 1, the subscribed charging feature 1, and the static IP address 1.

Step 202: The data management network element sends the found first subscription data associated with the DNN and the slice information to the SMF network element. Correspondingly, the SMF network element receives the first subscription data from the data management network element.

Therefore, according to the solution of this embodiment of the present invention, when the SMF network element requests the subscription data of the terminal device from the data management network element, both the DNN and the slice information are provided. In this way, the data management network element may send the first subscription data associated with the DNN and the slice information to the requested SMF, thereby meeting a parameter requirement specific to the slice. In addition, the data management network element does not need to send subscription data associated with another slice to the SMF. This conforms to a principle of mutual isolation between slices, and also avoids signaling and resource waste.

A scenario of an internet of vehicles in FIG. 1 is used as an example. The terminal device may be a vehicle in the internet of vehicles. A PDU session 1 may be set up on a URLLC slice (for example, the slice 1) to exchange control information with a DN, and a PDU session 2 may be set up on an eMBB slice (for example, the slice 2) at the same time to transmit a data stream with the DN (for example, upload a monitoring video stream of an operator cabin to the DN, or dynamically download traffic data from the DN). The terminal device may be connected to a same DN (for example, a corresponding DNN 1) through two slices. Subscribed AMBRs, subscribed QoS profiles, subscribed charging features, static IP addresses, and SSC modes of PDU sessions on the two slices may differ greatly. Therefore, the data management network element needs to manage the subscription data by using a slice as a granularity. If the SMF network element 108*a* of the slice 1 requests subscription data by sending the DNN 1 and slice information of the slice 1 to the data management network element, the data management network element sends subscription data corresponding to the slice 1 to the SMF network element 108*a*, and does not send subscription data corresponding to the slice 2 to the SMF network element 108*a*, thereby meeting a parameter requirement specific to the slice and a principle of mutual isolation between slices, and avoiding signaling and resource waste.

FIG. 2B shows a session information management method according to an embodiment of the present invention. The method includes the following steps.

Step 211: An SMF network element obtains a DNN and slice information.

Step 212: The SMF network element sends identification information of a terminal device, SMF information, the DNN, and the slice information to a data management network element, to register the SMF network element with the data management network element. Correspondingly, the data management network element receives the identification information of the terminal device, the SMF information, the data network name DNN, and the slice information from the SMF network element.

For the identification information of the terminal device and the slice information, refer to the descriptions of FIG. 2A. The SMF information includes at least one of identification information (an SMF ID) of the SMF network element and address information (an SMF address) of the SMF network element.

For example, the SMF network element may invoke an NF service of a UDM to register the SMF network element. A service for requesting registration of the SMF network element may be Nudm_UEContextManagement_Registration. For example, the service may be invoked by sending Nudm_UEContextManagement_RegistrationRequest, and Nudm_UEContextManagement_RegistrationRequest includes the identification information of the terminal device, the SMF information, the DNN, and the slice information. In other words, input for invoking the service includes the identification information of the terminal device, the SMF information, the DNN, and the slice information. Alternatively, the SMF may send, to the UDM, another request message carrying the identification information of the terminal device, the SMF information, the DNN, and the slice information, to register the SMF with the UDM.

Step 213: The data management network element stores the SMF information associated with the DNN and the slice information into context information of the terminal device.

For example, the context information of the terminal device may be in a format shown in Table 2.

TABLE 2

| SMF ID 1 | Slice information 1 | DNN 1 |
| SMF ID 2 | Slice information 2 | DNN 1 |

In Table 2, the SMF ID is used as an example of the SMF information. However, the SMF ID may be replaced with the SMF address, or both the SMF ID and the SMF address are stored. As shown in Table 2, a dimension of the slice information is added to the context information of the terminal to distinguish between SMF network elements corresponding to different slices connected to a same DN.

It should be noted that the foregoing steps may be used to register the SMF network element with the data management network element. These steps may constitute an independent embodiment, or may be performed after the steps in FIG. 2A are completed. If these steps are performed after the steps in FIG. 2A are completed, step 211 may be skipped. Alternatively, the foregoing steps and the steps in FIG. 2A may be simultaneously performed. For example, if the SMF further provides the SMF information to the data management network element in step 201 in FIG. 2A, the data management network element may register the SMF network element when providing the subscription data to the SMF network element.

An objective of registering the SMF network element with the data management network element is as follows: When subscription data in the data management network element is updated, a related SMF network element may be determined based on the slice information and the DNN, and the updated subscription data may be notified to the SMF network element. Therefore, according to the solution of this embodiment of the present invention, when subscription data in the UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

Optionally, the two solutions in FIG. 2A and FIG. 2B may further include the following steps.

In a possible design, after the SMF network element is registered with the data management network element, the subscription data may be updated.

For example, the data management network element updates the first subscription data of the terminal device to second subscription data; determines the DNN and the slice information that are associated with the first subscription data; and sends the identification information of the terminal device, the DNN, the slice information, and the second subscription data to the SMF network element associated with the DNN and the slice information.

The SMF network element receives the identification information of the terminal device, the second subscription data, the DNN, and the slice information from the data management network element; and updates the first subscription data associated with the DNN and the slice information to the second subscription data.

This part of content is further described below with reference to FIG. 4.

In a possible design, the data management network element may trigger a PDU session release procedure.

For example, the data management network element sends the identification information of the terminal device, the DNN, and the slice information to the SMF network element. Correspondingly, the SMF network element receives the identification information of the terminal device, the DNN, and the slice information from the data management network element; and deletes, from the SMF network element, the first subscription data that is of the terminal device and that is associated with the DNN and the slice information.

In addition, the data management network element deletes the first subscription data from the data management network element; and deletes the SMF information from the context information of the terminal device.

This part of content is further described below with reference to FIG. 5.

In a possible design, the SMF network element may trigger deletion of the SMF information from the data management network element.

For example, the SMF network element sends the identification information of the terminal device, the DNN, and the slice information to the data management network element, to delete the SMF information associated with the DNN and the slice information. Correspondingly, the data management network element receives the identification information of the terminal device, the DNN, and the slice information from the SMF network element; and deletes, from the context information of the terminal device, the SMF information associated with the DNN and the slice information.

This part of content is further described below with reference to FIG. 6.

Session information management methods in the embodiments of this application are described below with reference to embodiments of FIG. 3 to FIG. 6.

Figure 3:
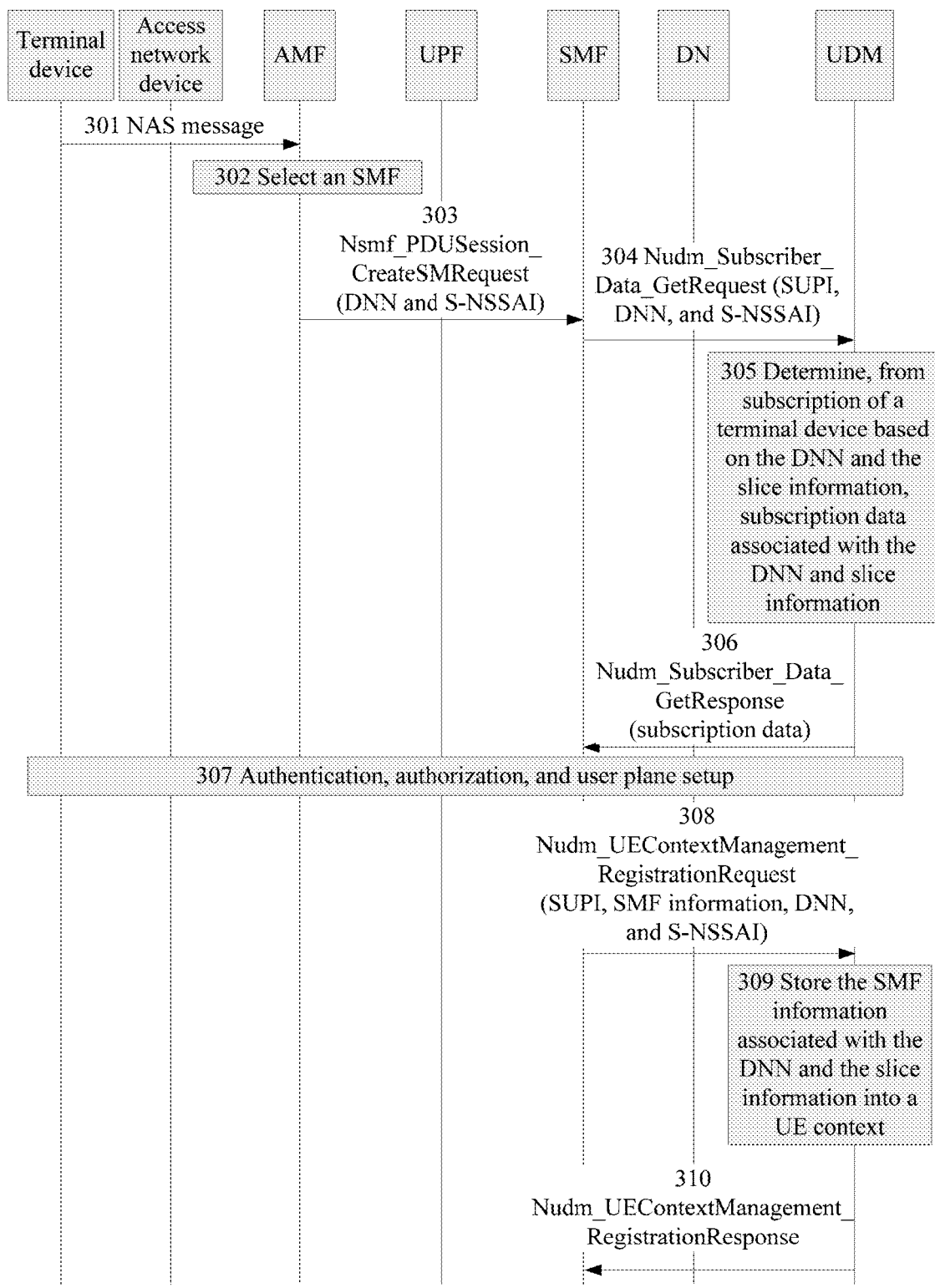
FIG. 3 is a signaling interaction diagram of setting up a packet data unit (Packet Data Unit, PDU) session according to an embodiment of the present invention.

The method of FIG. 3 is applicable to a PDU session setup procedure. As shown in FIG. 3, the method includes the following steps.

Step 301: A terminal device initiates a PDU session setup procedure. For example, the terminal device sends a non-access stratum (non-access stratum, NAS) message to an AMF. The NAS message includes session management (session management, SM) information (for example, N1 SM information), S-NSSAI, and a DNN, and the session management information carries a PDU session setup request.

Step 302: The AMF selects an SMF based on the S-NSSAI.

Step 303: The AMF sends the DNN and the S-NSSAI to the SMF, to instruct the SMF to set up a session.

For example, the AMF may invoke an NF service (for example, Nsmf_PDUSession_CreateSM) that is of the SMF and that is used to set up a PDU session, to instruct the SMF to set up a session. The service may be invoked by sending a request message (for example, Nsmf_PDUSession_CreateSMRequest), and Nsmf_PDUSession_CreateSMRequest includes the DNN and the S-NSSAI. In other words, input for invoking the service includes the DNN and the S-NSSAI. Alternatively, the AMF may send, to the SMF, another request message carrying the DNN and the S-NSSAI, to instruct the SMF to set up a session.

Step 304: After receiving the DNN and the S-NSSAI, the SMF sends identification information of the terminal device, the DNN, and slice information to a UDM, to request subscription data associated with the DNN and the slice information.

For example, the SMF may invoke a Nudm_Subscriber_Data_Get service to request UE subscription data. The service may be invoked by sending Nudm_Subscriber_Data_GetRequest, and Nudm_Subscriber_Data_GetRequest includes the identification information of the terminal device, the DNN, and the slice information. In other words, input for invoking the service includes the identification information of the terminal device, the DNN, and the slice information. In addition, the input may further include SMF information (at least one of an SMF ID or an SMF address) and a requested subscription data type. For example, the requested subscription data type is SM subscription data. Alternatively, the SMF may send, to the UDM, another request message carrying the identification information of the terminal device, the DNN, and the slice information, to request the subscription data associated with the DNN and the slice information.

Step 305: After receiving the identification information of the terminal device, the DNN, and the slice information, the UDM determines, from subscription data of the terminal device based on the DNN and the slice information, the subscription data associated with the DNN and the slice information.

For example, the subscription data that is of the terminal device and that is stored in the UDM may be in a format shown in Table 1.

Step 306: The UDM sends the subscription data associated with the DNN and the slice information to the SMF. For example, the UDM may send, to the SMF, a response message that carries UE subscription data associated with the DNN and the slice information. For example, the response message may be a response message Nudm_SubscriberData_GetResponse of the Nudm_Subscriber_Data_Get service. Optionally, the response message further carries the slice information and the DNN.

For the steps 304 to 306, refer to the descriptions of FIG. 2A.

Step 307: A plurality of sides interact with each other, to implement authentication, authorization, and user plane setup.

Step 308: Optionally, if the input in step 304 does not include the SMF information, the SMF sends the identification information of the terminal device, the SMF information, the DNN, and the slice information to the UDM, to register the SMF with the UDM.

For example, the SMF may invoke a Nudm_UEContextManagement_Registration service to register the SMF. The service may be invoked by sending Nudm_UEContextManagement_RegistrationRequest, and Nudm_UEContextManagement_RegistrationRequest includes the identification information of the terminal device, the SMF information, the DNN, and the slice information. In other words, input for invoking the service includes the identification information of the terminal device, the SMF information, the DNN, and the slice information. Alternatively, the SMF may send, to the UDM, another request message carrying the identification information of the terminal device, the SMF information, the DNN, and the slice information, to register the SMF with the UDM.

Step 309: The UDM stores the SMF information associated with the DNN and the slice information into a UE context. For example, the UE context may be in a format shown in Table 2.

For the steps 308 to 309, refer to the descriptions of FIG. 2B.

Step 310: The UDM returns a response message to the SMF.

Optionally, the response message carries the DNN and the slice information.

According to the solution of this embodiment of the present invention, the data management network element may send the first subscription data associated with the DNN and the slice information to the requested SMF, thereby meeting a parameter requirement specific to the slice. In addition, the data management network element does not need to send subscription data associated with another slice to the SMF. This conforms to a principle of mutual isolation between slices, and also avoids signaling and resource waste. In addition, when subscription data in the UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

It should be noted that the steps 304 to 306 may correspond to an interaction procedure in which an SMF in a service architecture invokes an NF service Nudm_Subscriber_Data_Get of the UDM. Steps 308 to 310 may correspond to an interaction procedure in which the SMF in the service architecture invokes the NF service Nudm_UEContextManagement_Registration of the UDM.

Figure 4:
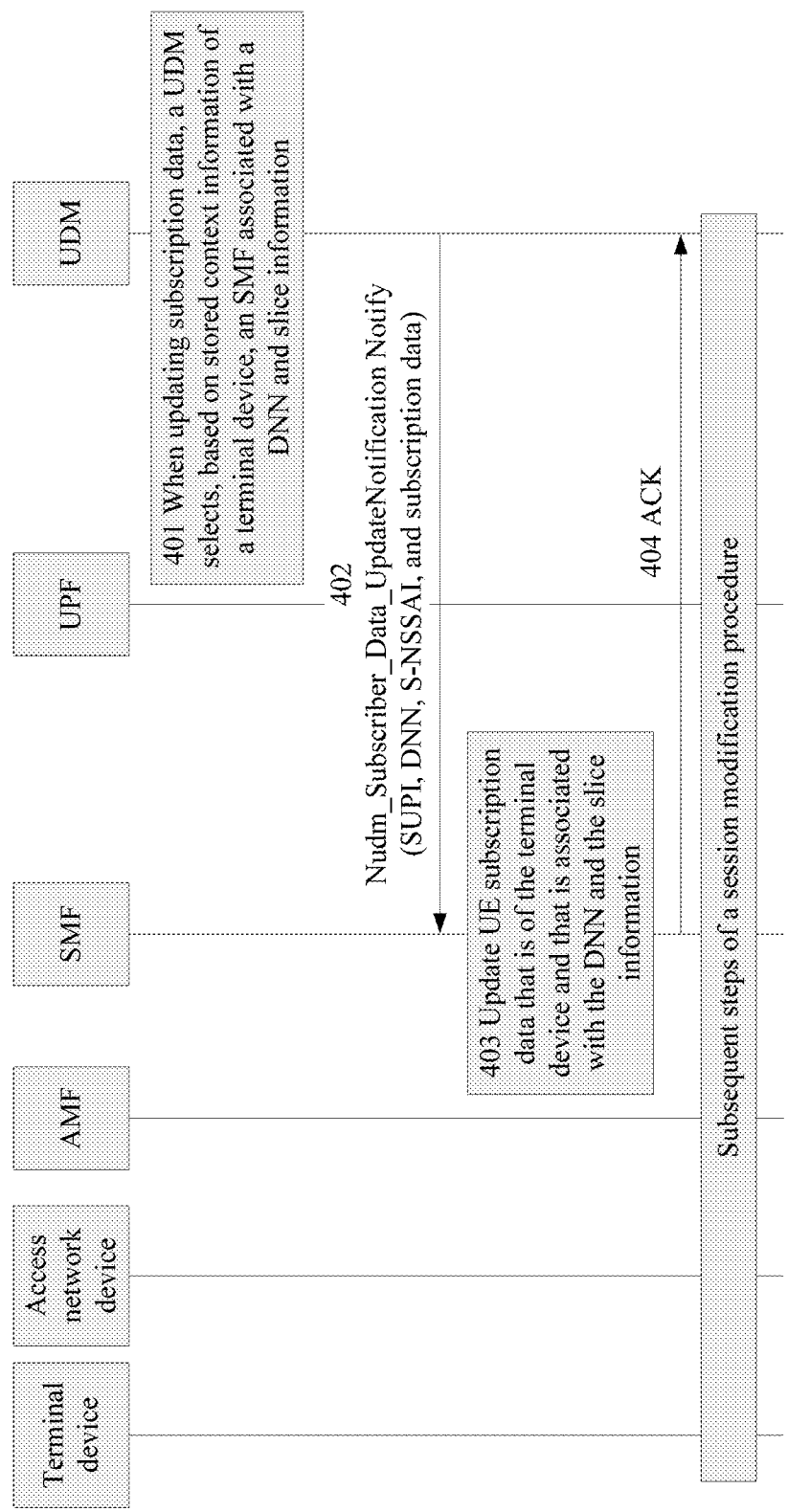
FIG. 4 is a signaling interaction diagram of modifying a PDU session according to an embodiment of the present invention.

The method of FIG. 4 is applicable to a PDU session modification procedure. As shown in FIG. 4, the method includes the following steps.

Step 401: When a UDM updates subscription data, the UDM selects, based on stored context information of a terminal device, an SMF associated with a DNN and slice information.

For example, the subscription data stored in the UDM may be configured or maintained by a network management device. When specific subscription data of the terminal device is modified, for example, an AMBR is changed because a user changes a package, and therefore the UDM updates the subscription data.

Specifically, after updating first subscription data of the terminal device to second subscription data, the UDM determines a DNN and slice information associated with the first subscription data, to further determine an SMF network element associated with the DNN and the slice information.

For example, when a subscribed session-AMBR 1 of subscription data in Table 1 is updated to a subscribed session-AMBR 4, the UDM determines slice information 1 and a DNN 1 of a slice 1 associated with the subscribed AMBR 1, and then selects, based on context information in Table 2, an SMF (with an SMF ID 1) associated with the DNN 1 and the slice information 1.

Step 402: The UDM sends the DNN and the slice information to the SMF, to update subscription data that is of the terminal device and that is associated with the DNN and the slice information.

For example, the UDM may invoke a Nudm_Subscriber_Data_UpdateNotification service, to update UE subscription data associated with the DNN and the slice information. The service may be invoked by sending Nudm_Subscriber_Data_UpdateNotification Notify, and Nudm_Subscriber_Data_UpdateNotification Notify includes identification information of the terminal device, the DNN, the slice information, and the subscription data (for example, the second subscription data). In other words, input for invoking the service includes the identification information of the terminal device, the DNN, the slice information, and the subscription data (for example, the second subscription data). Alternatively, the UDM may send, to the SMF, another notification message carrying the identification information of the terminal device, the DNN, the slice information, and the subscription data, to update the subscription data that is of the terminal device and that is associated with the DNN and the slice information.

Step 403: The SMF updates, based on input information, the UE subscription data that is of the terminal device and that is associated with the DNN and the slice information.

For example, the input includes the identification information of the terminal device, the DNN 1, the slice information 1 of the slice 1, and the subscribed-session-AMBR 4. Therefore, the SMF updates the subscribed-session-AMBR 1 that is of the terminal device and that is associated with the DNN 1 and the slice 1 to the subscribed-session-AMBR 4.

Step 404: After updating the subscription data, the SMF returns, to the UDM, an acknowledgement (acknowledge, ACK) message carrying the identification information of the terminal device. In other words, output obtained after the service is invoked includes the identification information of the terminal device.

After step 404 is completed, subsequent steps of a session modification procedure may be performed with reference to the prior art.

According to the solution of this embodiment of the present invention, when subscription data in the UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

It should be noted that the steps 402 to 404 correspond to an interaction procedure in which a UDM in a service architecture invokes an NF service Nudm_Subscriber_Data_UpdateNotification of the SMF.

Figure 5:
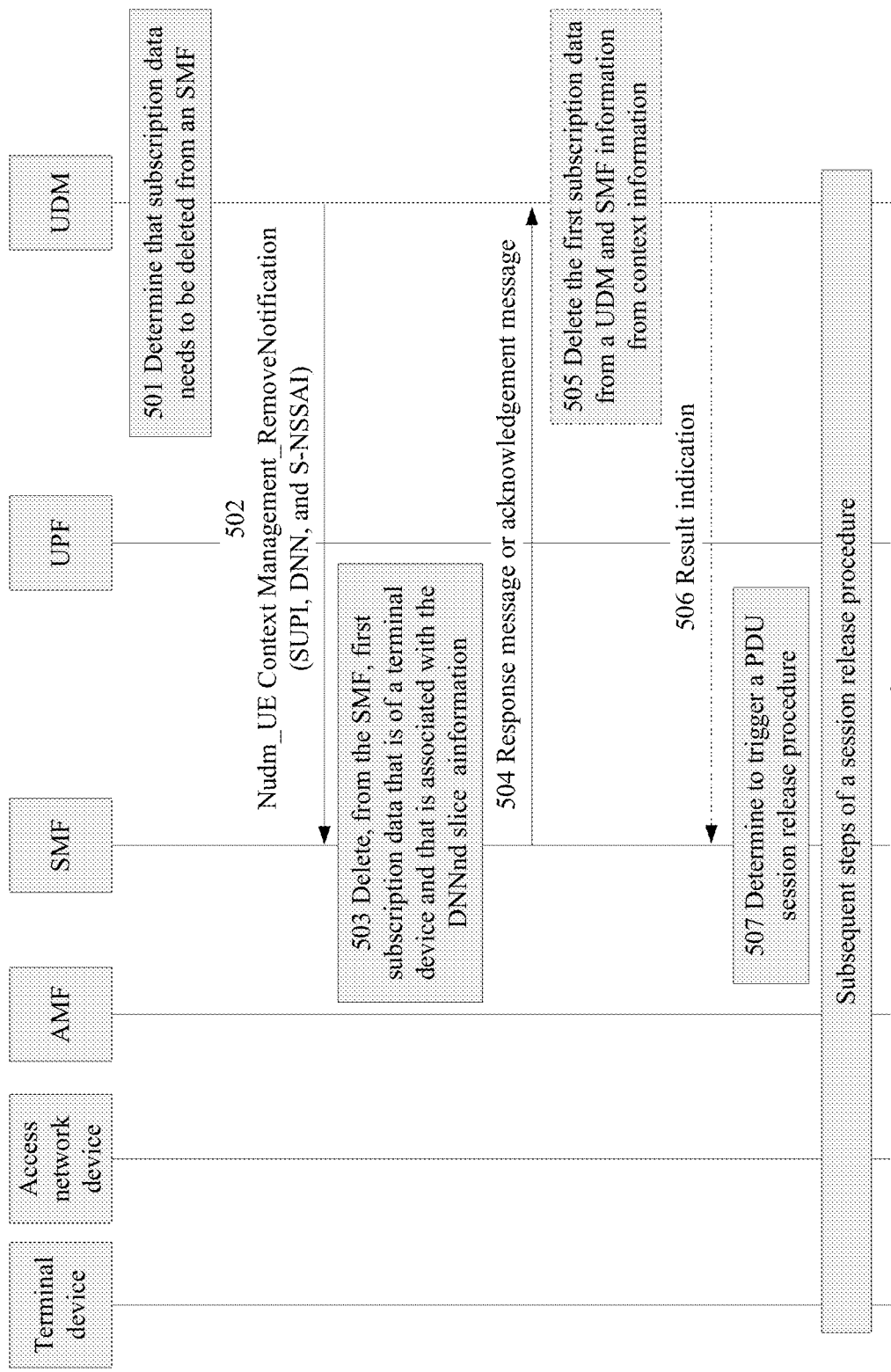
FIG. 5 is a signaling interaction diagram of releasing a PDU session according to an embodiment of the present invention.

The method of FIG. 5 is applicable to a PDU session release procedure, and is applicable to a PDU session release procedure triggered by a UDM. As shown in FIG. 5, the method includes the following steps.

Step 501: The UDM determines that subscription data needs to be deleted from an SMF.

For example, the UDM determines a DNN and slice information that are associated with the subscription data that needs to be deleted, and further determines, based on context information of a terminal device, the SMF associated with the DNN and the slice information.

Step 502: The UDM sends identification information of the terminal device, the DNN, and the slice information to the SMF, to delete, from the SMF, first subscription data that is of the terminal device and that is associated with the DNN and the slice information.

For example, the UDM may invoke a Nudm_UE Context Management_RemoveNotification service to delete the subscription data from the SMF. The service may be invoked by sending Nudm_Subscriber_Data_UpdateNotification Notify carrying the identification information of the terminal device, the DNN, and the slice information or Nudm_Subscriber_Data_UpdateNotification Request carrying the identification information of the terminal device, the DNN, and the slice information. In other words, input for invoking the service includes the identification information of the terminal device, the DNN, and the slice information. Alternatively, the UDM may send, to the SMF, another notification message or request message that carries the identification information of the terminal device, the DNN, and the slice information, to delete the subscription data from the SMF.

Step 503: The SMF deletes, from the SMF, the first subscription data that is of the terminal device and that is associated with the DNN and the slice information.

Step 504: The SMF returns a response message or an acknowledgement message.

It should be noted that the UDM may delete the first subscription data from the UDM and the SMF information from the context information when determining that the subscription data needs to be deleted from the SMF in step

501. For example, the UDM may first delete the first subscription data from the UDM, and this causes deletion of the SMF information from the context information. Alternatively, only after receiving the response message or the acknowledgement message in step 504, the UDM may delete the first subscription data from the UDM and the SMF information from the context information by the following step 505. If the first subscription data is deleted from the UDM and the SMF information is deleted from the context information before step 504, steps 505 and 506 may be skipped. Alternatively, steps 505 and 506 may be performed after a session release procedure is completed.

Step 505: The UDM deletes the first subscription data from the UDM and the SMF information from the context information.

Step 506: The UDM sends a result indication (Result indication) to the SMF.

Step 507: The SMF determines to trigger a PDU session release procedure, and performs subsequent steps of the session release procedure with reference to the prior art.

According to the solution of this embodiment of the present invention, when the UDM determines that the subscription data needs to be deleted from the SMF, the UDM may find, based on the context information of the terminal device, the SMF corresponding to the subscription data, to instruct the SMF to delete the subscription data, and the UDM deletes the information related to the SMF from the context information of the terminal device. Therefore, a principle of mutual isolation between slices is met, and signaling and resource waste is avoided.

It should be noted that the steps 502 to 504 correspond to an interaction procedure in which a UDM in a service architecture invokes an NF service Nudm_UE Context Management_RemoveNotification of the SMF.

Figure 6:
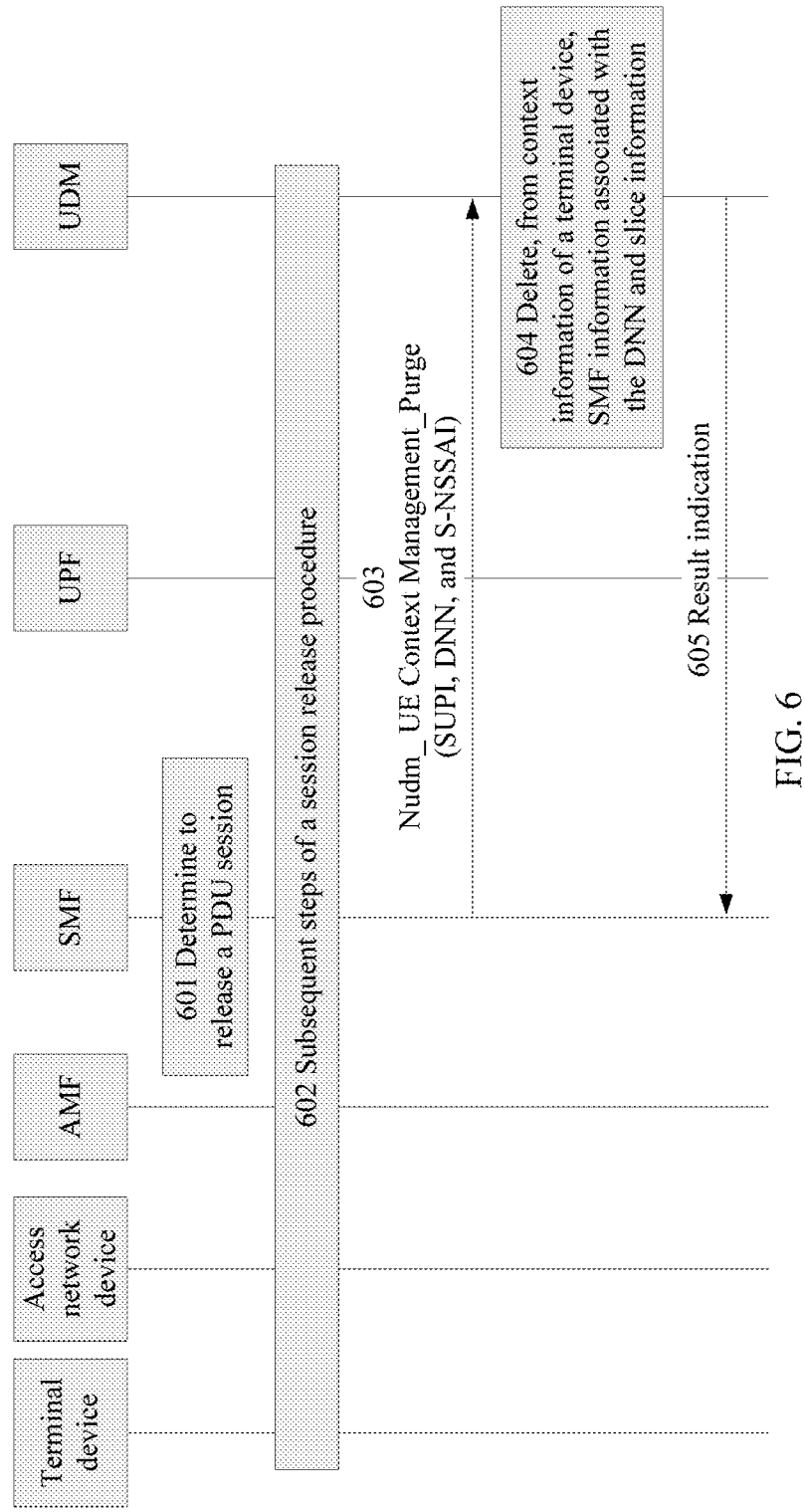
FIG. 6 is another signaling interaction diagram of releasing a PDU session according to an embodiment of the present invention.

The method of FIG. 6 is applicable to a PDU session release procedure, and is applicable to deletion, triggered by an SMF, of SMF information from a UDM. As shown in FIG. 6, the method includes the following steps.

Step 601: The SMF determines to release a PDU session. In other words, the SMF determines to trigger a PDU session release procedure. For example, the SMF determines to release a PDU session based on a request from the UDM, a request from a DN, or a locally configured policy.

Step 602: Perform a subsequent PDU session release procedure with reference to the prior art.

Step 603: When determining that a served slice and a last PDU session of a terminal device in the DN are released, the SMF sends identification information of the terminal device, the DNN, and the slice information to the UDM, to delete the SMF information associated with the DNN and the slice information.

For example, the SMF may invoke a Nudm_UE Context Management_Purge service, to delete the SMF information associated with the DNN and the slice information. The service may be invoked by sending Nudm_UE Context Management_Purge Notify carrying the identification information of the terminal device, the DNN, and the slice information or Nudm_UE Context Management_Purge Request carrying the identification information of the terminal device, the DNN, and the slice information. In other words, input for invoking the service includes the identification information of the terminal device, the DNN, and the slice information. Alternatively, the UDM may send, to the SMF, another notification message or request message that carries the identification information of the terminal device, the DNN, and the slice information, to delete the SMF information associated with the DNN and the slice information.

Step 604: The UDM deletes, from context information of the terminal device, the SMF information associated with the DNN and the slice information.

Step 605: The UDM sends a result indication to the SMF.

According to the solution of this embodiment of the present invention, after receiving the DNN and the slice information, the UDM may find, based on the context information of the terminal device, the SMF information corresponding to the DNN and the slice information, to delete the information related to the SMF from the context information of the terminal device. Therefore, a principle of mutual isolation between slices is met, and signaling and resource waste is avoided.

It should be noted that the steps 603 to 605 correspond to an interaction procedure in which an SMF in a service architecture invokes an NF service Nudm_UEContextManagement_Purge of the UDM Nudm_UEContextManagement_Purge.

Figure 7:
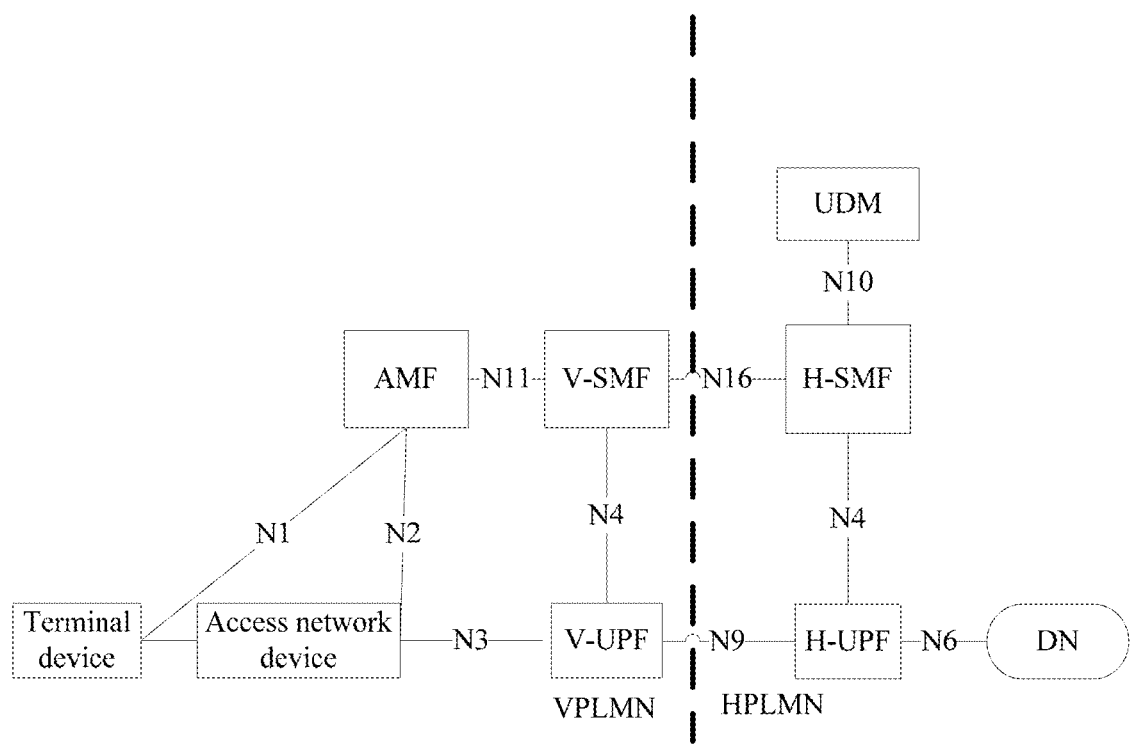
FIG. 7 is a schematic diagram of a communications system in a network slice-based home-routed roaming (home-routed roaming) scenario applicable to an embodiment of the present invention.

FIG. 7 is a schematic architectural diagram of a home-routed roaming scenario applicable to the present invention. When a terminal device roams from a home HPLMN to a visited public land mobile network (visited public land mobile network, VPLMN), the terminal device accesses a slice V in the VPLMN by using an access network device in the VPLMN. The slice V includes a V-SMF and a V-UPF. In addition, an H-SMF and a UDM in the HPLMN are connected. The terminal device is connected to a DN through the V-UPF and an H-UPF. The H-SMF and the H-UPF form a slice H in the HPLMN.

In a roaming scenario, the H-SMF and the UDM in the HPLMN interact with each other to perform methods similar to the methods shown in FIG. 3 to FIG. 6. Slice information is specifically used to identify a slice in the HPLMN, for example, hS-NSSAI, which is also referred to as H-slice information.

Figure 8A:
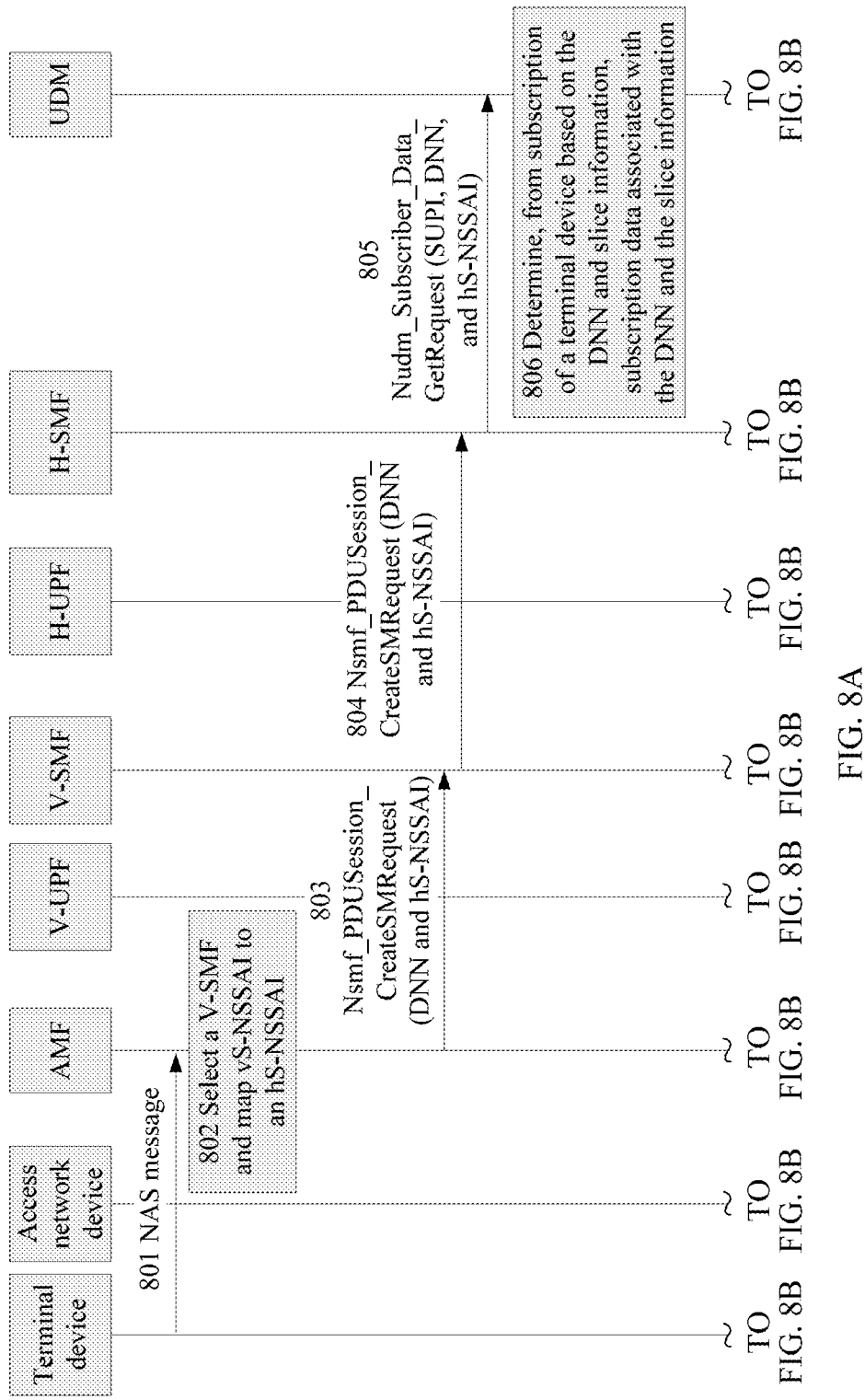
FIG. 8A and FIG. 8B are a signaling interaction diagrams of setting up a PDU session according to an embodiment of the present invention.
Figure 8B:
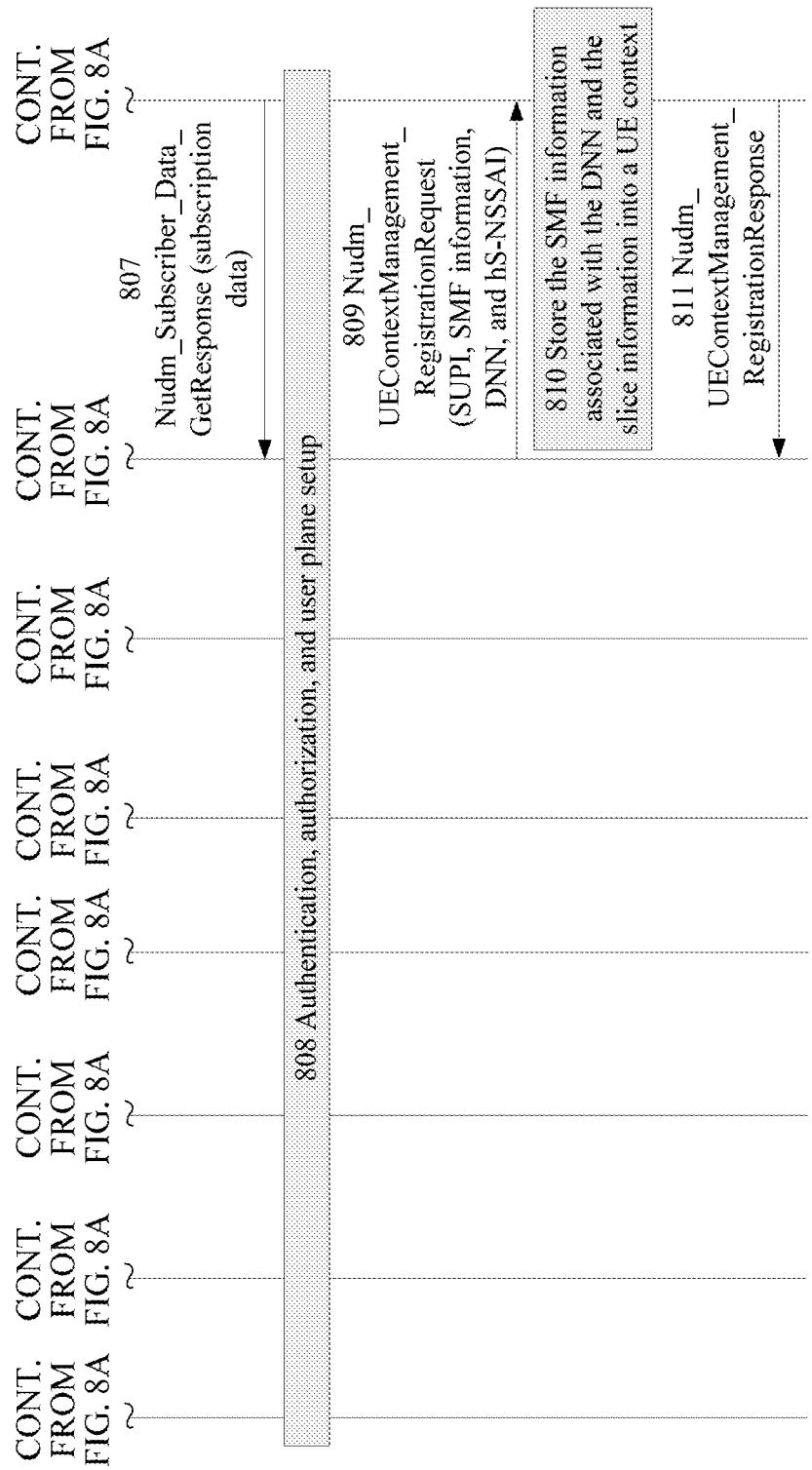

For example, FIG. 8A and FIG. 8B are a signaling interaction diagram of setting up a PDU session in a home-routed roaming scenario.

Step 801: A terminal device sends a NAS message to an AMF, where the NAS message includes SM information, vS-NSSAI, and a DNN, the session management information carries a PDU session setup request, and the vS-NSSAI is used to identify a type of a slice in a VPLMN.

Step 802: The AMF selects a V-SMF based on the vS-NSSAI and maps the vS-NSSAI to hS-NSSAI.

Step 803: The AMF sends the DNN and the vS-NSSAI to the V-SMF, to instruct the V-SMF to set up a session.

For example, the AMF may invoke an NF service (for example, Nsmf_PDUSession_CreateSM) that is of the SMF and that is used to set up a PDU session, to instruct the V-SMF to set up a session. Input for invoking the service includes the DNN and h-NSSAI.

Step 804: The V-SMF invokes an Nsmf_PDUSession_CreateSM service to instruct an H-SMF to set up a session. In other words, the V-SMF transfers the DNN and the h-NSSAI to the H-SMF.

Step 805: After receiving the DNN and the hS-NSSAI, the H-SMF sends identification information of the terminal device, the DNN, and slice information to a UDM, to request subscription data associated with the DNN and the slice information.

Step 806: After receiving the identification information of the terminal device, the DNN, and the slice information, the UDM determines, from subscription data of the terminal device based on the DNN and the slice information, the subscription data associated with the DNN and the slice information.

Step 807: The UDM sends the subscription data associated with the DNN and the slice information to the H-SMF.

Step 808: A plurality of sides interact with each other, to implement authentication, authorization, and user plane setup.

Step 809: Optionally, if input in step 805 does not include H-SMF information, the H-SMF sends the identification information of the terminal device, SMF information of the H-SMF, the DNN, and the slice information to the UDM, to register the H-SMF with the UDM.

Step 810: The UDM stores the SMF information associated with the DNN and the slice information into a UE context.

Step 811: The UDM returns a response message to the H-SMF.

For the steps 805 to 811, refer to the descriptions of steps 304 to 310 in FIG. 3. Interaction between the H-SMF and the UDM in FIG. 8A and FIG. 8B is consistent with interaction between an SMF and a UDM in FIG. 3.

Figure 9:
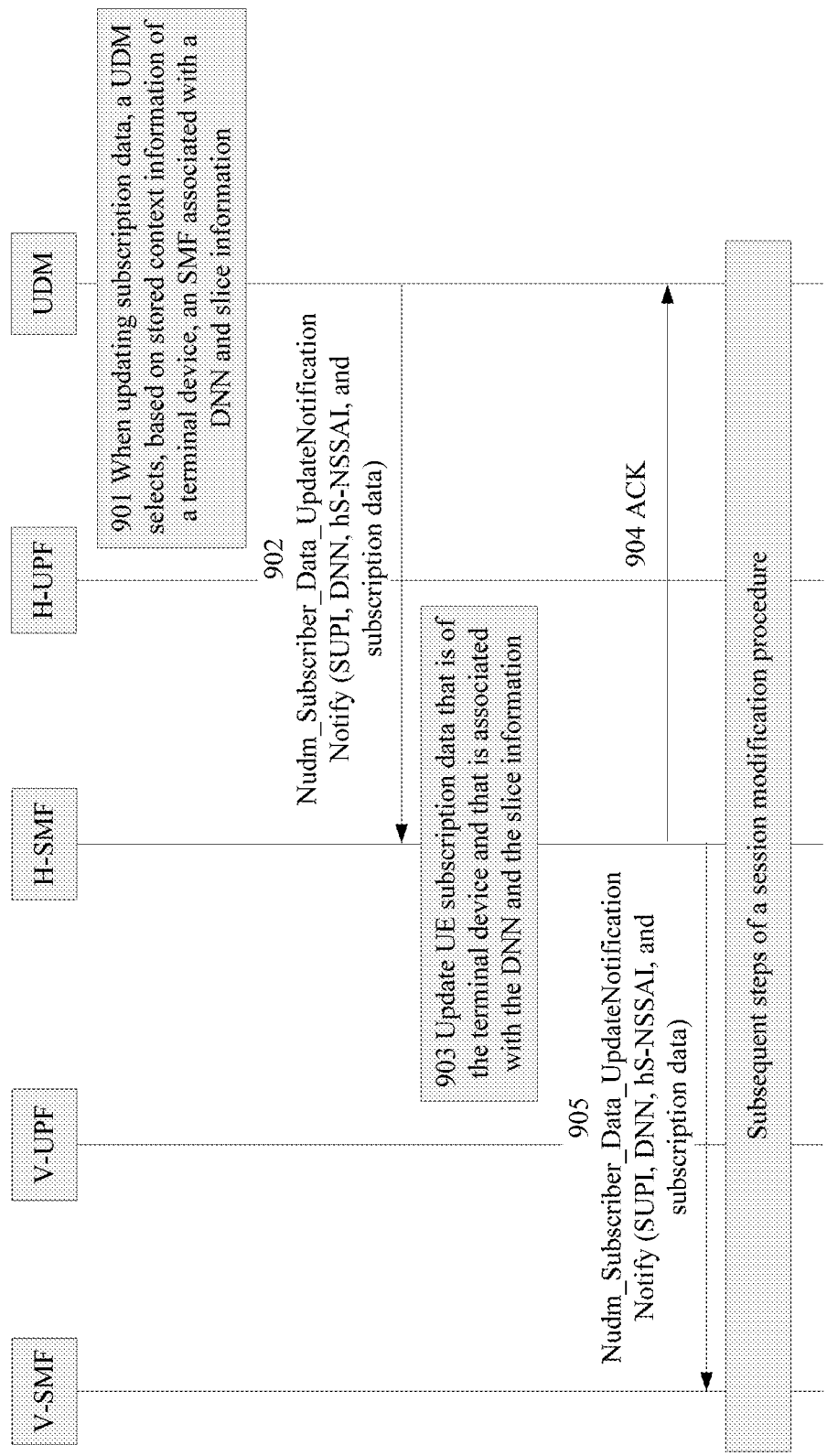
FIG. 9 is a signaling interaction diagram of modifying a PDU session according to an embodiment of the present invention.

FIG. 9 is a signaling interaction diagram of modifying a PDU session in a home-routed roaming scenario. For steps 901 to 904, refer to the descriptions of steps 401 to 404 in FIG. 4. Interaction between an H-SMF and a UDM in FIG. 9 is consistent with interaction between an SMF and a UDM in FIG. 4. The method further includes the following step:

Step 905: The H-SMF sends a DNN and H-slice information to a V-SMF. For example, the H-SMF invokes an Nsmf_PDU Session_UpdateNotification service to update subscription data on a specified slice in a VPLMN. For example, input for invoking the service includes the DNN and the H-slice information.

After step 905 is completed, subsequent steps of a session modification procedure may be performed with reference to the prior art.

Figure 10A:
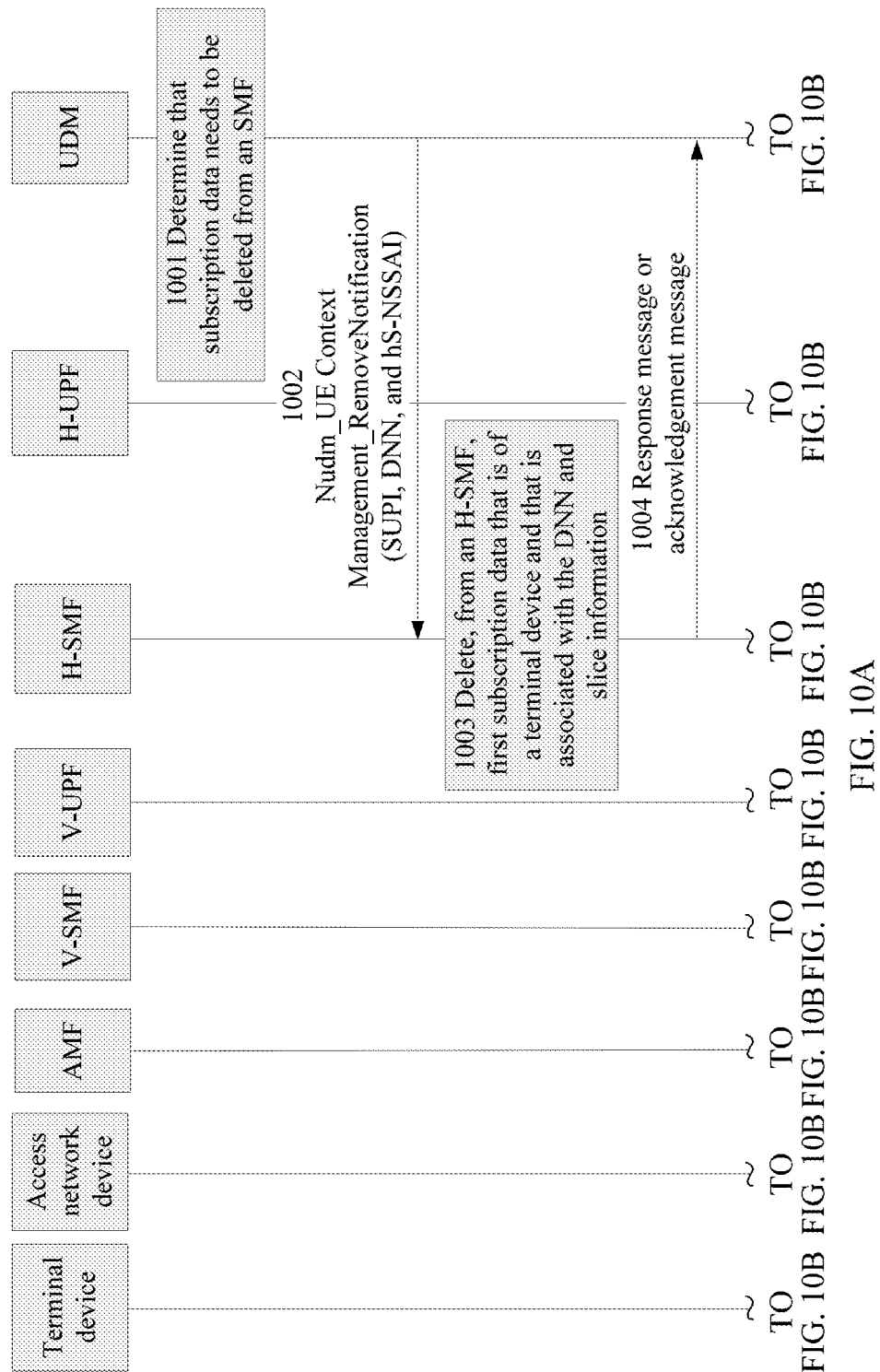
FIG. 10A and FIG. 10B are a signaling interaction diagram of releasing a PDU session according to an embodiment of the present invention.
Figure 10B:
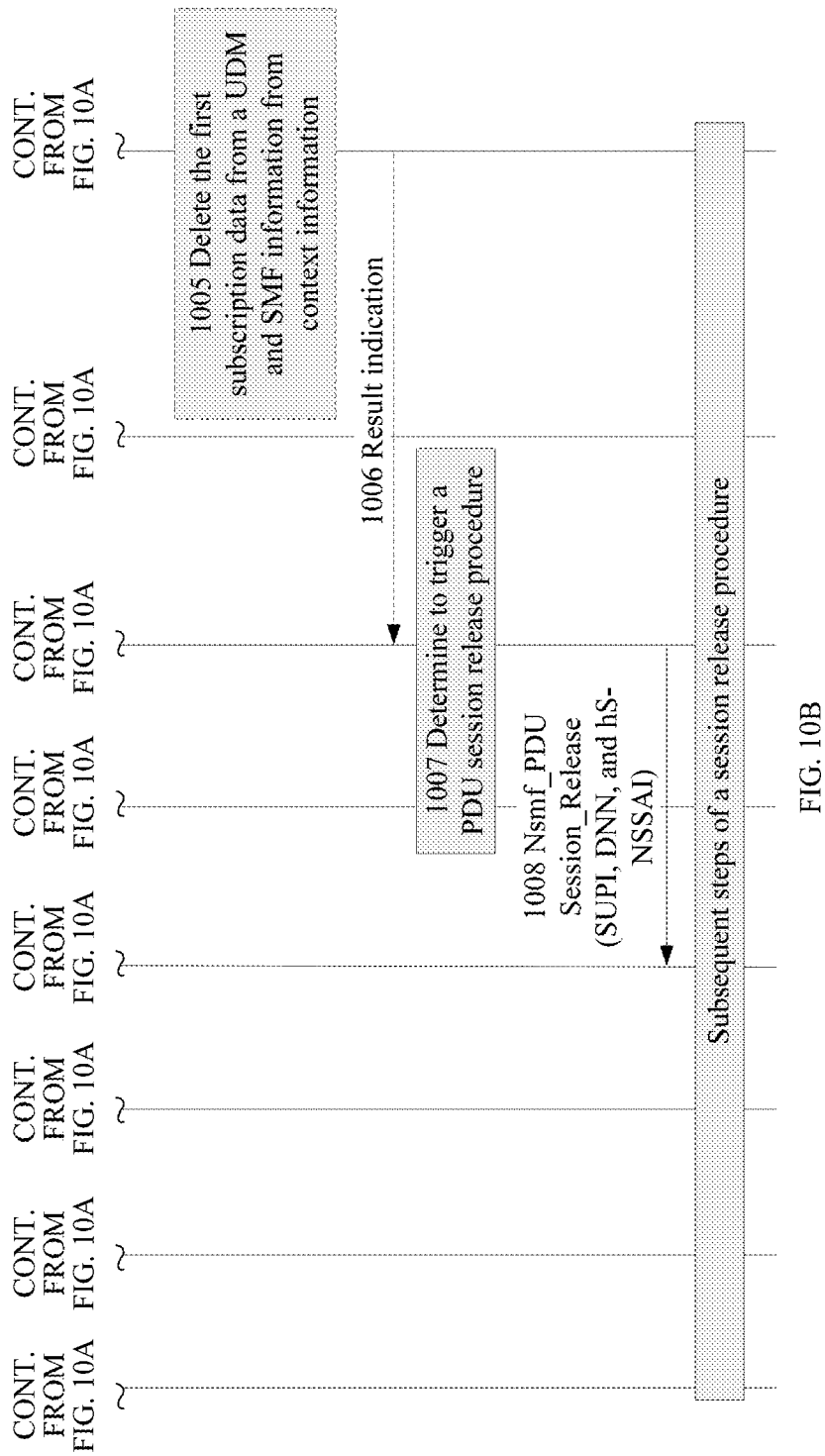

FIG. 10A and FIG. 10B are a signaling interaction diagram of releasing a PDU session in a home-routed roaming scenario. For steps 1001 to 1007, refer to the descriptions of steps 501 to 507 in FIG. 5. Interaction between an H-SMF and a UDM in FIG. 10A and FIG. 10B is consistent with interaction between an SMF and a UDM in FIG. 5. The method further includes the following step:

Step 1008: The H-SMF sends a DNN and H-slice information to a V-SMF. For example, the H-SMF invokes an Nsmf_PDU Session_Release service to delete subscription data from the V-SMF. For example, input for invoking the service includes the DNN and the H-slice information.

After step 1008 is completed, subsequent steps of a session release procedure may be performed with reference to the prior art.

Figure 11:
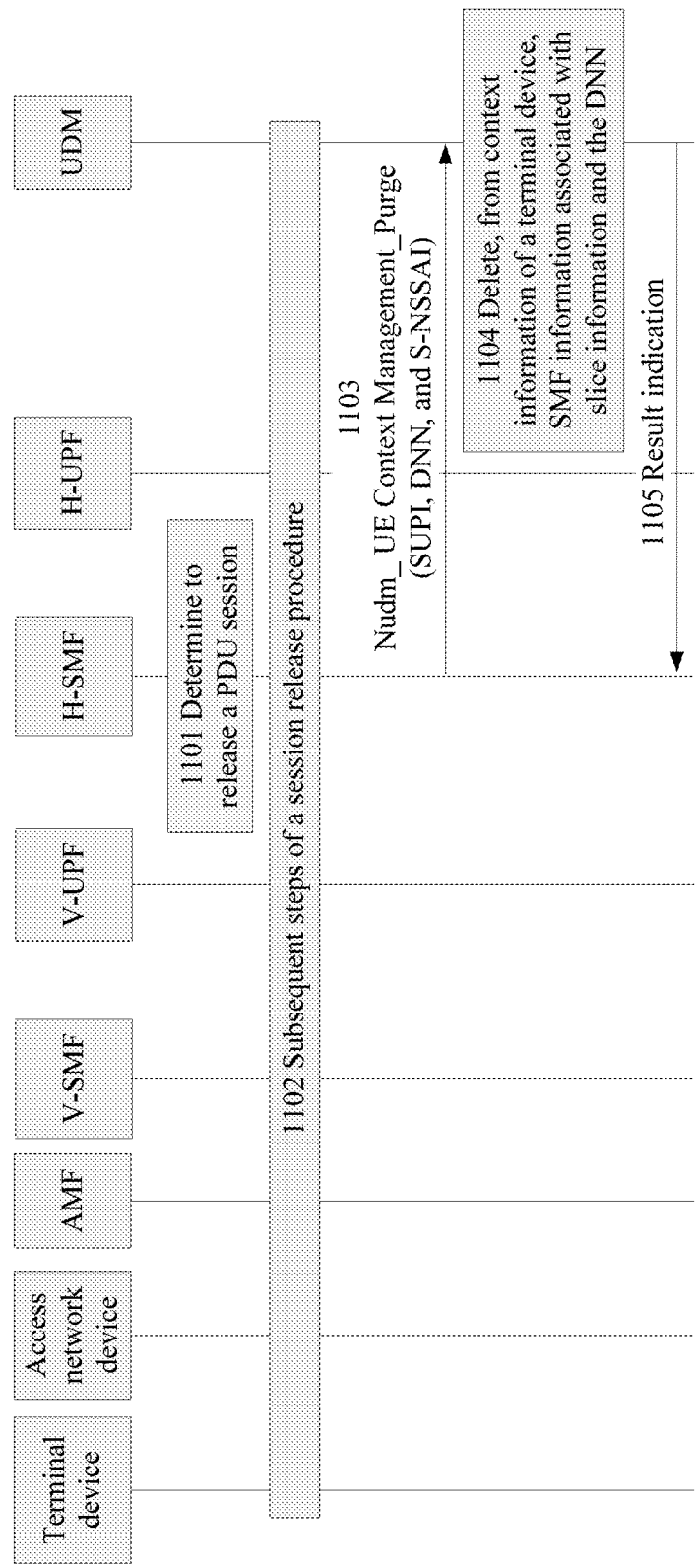
FIG. 11 is another signaling interaction diagram of releasing a PDU session according to an embodiment of the present invention.

FIG. 11 is a signaling interaction diagram of releasing a PDU session in a home-routed roaming scenario. For steps 1101 to 1105, refer to the descriptions of steps 601 to 605 in FIG. 6. Interaction between an H-SMF and a UDM in FIG. 11 is consistent with interaction between an SMF and a UDM in FIG. 6. A difference lies in that some steps in a session release procedure in step 1102 are related to a network element in a VPLMN.

In the foregoing embodiments provided in this application, the solutions of the session information management methods provided in the embodiments of this application are separately described from the perspective of network elements and the perspective of interaction between the network elements. It can be understood that to implement the foregoing functions, each network element such as the session management function network element or the data management network element includes a corresponding hardware structure and/or software module for performing each function. A person of ordinary skill in the art should easily be aware that in combination with units and algorithm steps in the examples described in the embodiments disclosed in this specification, this application may be implemented by hardware or a combination form of hardware and computer software. Whether a function is performed by hardware or hardware driven by computer software depends on particular applications and design constraints of the technical solutions. A person skilled in the art may use different methods to implement the described functions for each particular application, but it shall not be considered that the implementation goes beyond the scope of this application.

Figure 12A:
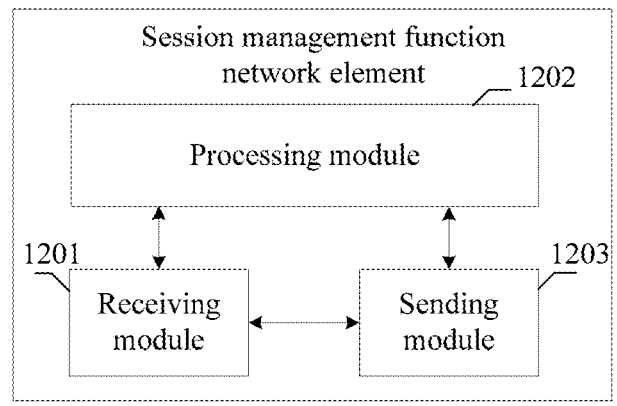
FIG. 12A and FIG. 12B are schematic structural diagrams of an SMF network element according to an embodiment of the present invention.

For example, when the network element performs a corresponding function by using a software module, the session management function network element may include a receiving module 1201, a processing module 1202, and a sending module 1203, as shown in FIG. 12A. The session management function network element may be configured to perform operations of the SMF and the H-SMF in FIG. 2 to FIG. 11.

For example, in an embodiment, the sending module 1203 is configured to send identification information of a terminal device, a data network name DNN, and slice information to a data management network element, to request first subscription data that is of the terminal device and that is associated with the DNN and the slice information. The slice information is used to identify a network slice served by the SMF network element. The receiving module 1201 is configured to receive the first subscription data from the data management network element.

Therefore, the data management network element may send the first subscription data associated with the DNN and the slice information to the requested SMF, thereby meeting a parameter requirement specific to the slice. In addition, the data management network element does not need to send subscription data associated with another slice to the SMF. This conforms to a principle of mutual isolation between slices, and also avoids signaling and resource waste.

Optionally, the sending module 1203 is further configured to send the identification information of the terminal device, SMF information, the DNN, and the slice information to the data management network element, to register the SMF network element with the data management network element. The SMF information includes at least one of identification information of the SMF network element and address information of the SMF network element.

In another embodiment, the receiving module 1201 is configured to obtain a data network name DNN and slice information. The slice information is used to identify a network slice served by the SMF network element. The sending module is configured to send identification information of a terminal device, SMF information, the DNN, and the slice information to a data management network element, to register the SMF network element with the data management network element. The SMF information includes at least one of identification information of the SMF network element and address information of the SMF network element.

Therefore, when subscription data in a UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

For either of the two embodiments, optionally, the receiving module 1201 is further configured to receive the identification information of the terminal device, second subscription data, the DNN, and the slice information from the data management network element. The processing module 1202 is configured to update the first subscription data associated with the DNN and the slice information to the second subscription data.

Optionally, the receiving module 1201 is further configured to receive the identification information of the terminal device, the DNN, and the slice information from the data management network element. The processing module 1202 is configured to delete, from the SMF network element, the first subscription data that is of the terminal device and that is associated with the DNN and the slice information.

Optionally, the sending module 1203 is further configured to send the identification information of the terminal device, the DNN, and the slice information to the data management network element, to delete the SMF information associated with the DNN and the slice information.

In addition, the receiving module 1201, the processing module 1202, and the sending module 1203 in the session management function network element may further implement another operation or function of the SMF or the H-SMF in the foregoing methods. Details are not described herein again.

Figure 12B:
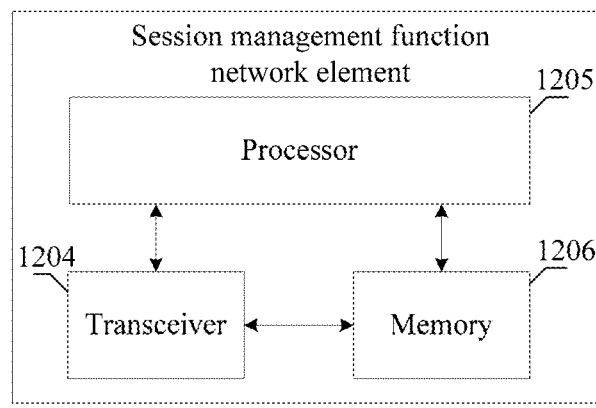

FIG. 12B shows another possible structural schematic diagram of a session management function network element in the foregoing embodiment. The session management function network element includes a transceiver 1204 and a processor 1205, as shown in FIG. 12B. For example, the processor 1205 is configured to process a corresponding function that is of an SMF or H-SMF and that is performed by the session management function network element in the foregoing methods. The transceiver 1204 is configured to implement communication between the SMF or H-SMF and an access and mobility management function network element/a data management network element. The session management function network element may further include a memory 1206. The memory is configured to be coupled to the processor, and stores a program instruction and data that are necessary for the session management function network element.

Figure 13A:
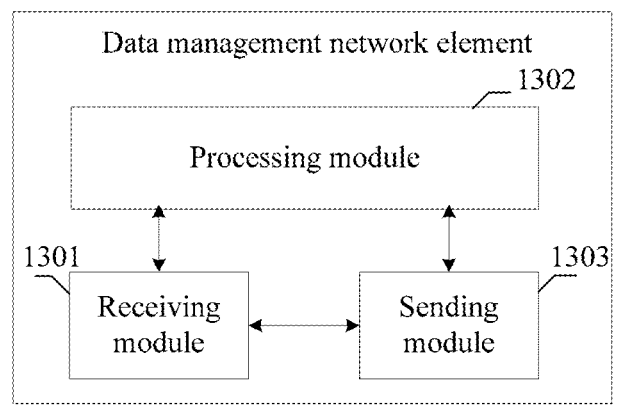
FIG. 13A and FIG. 13B are schematic structural diagrams of a data management network element according to an embodiment of the present invention.

The data management network element may include a receiving module 1301, a processing module 1302, and a sending module 1303, as shown in FIG. 13A. The data management network element may be configured to perform operations of the data management network element (for example, a UDM device 112) in FIG. 2 to FIG. 11.

For example, in an embodiment, the receiving module 1301 is configured to receive identification information of a terminal device, a data network name DNN, and slice information from a session management function SMF network element that are used to request first subscription data that is of the terminal device and that is associated with the DNN and the slice information. The slice information is used to identify a network slice served by the SMF network element. The sending module 1303 is configured to send the first subscription data to the SMF network element.

Therefore, the data management network element may send the first subscription data associated with the DNN and the slice information to the requested SMF, thereby meeting a parameter requirement specific to the slice. In addition, the data management network element does not need to send subscription data associated with another slice to the SMF. This conforms to a principle of mutual isolation between slices, and also avoids signaling and resource waste.

Optionally, the receiving module 1301 is further configured to receive the identification information of the terminal device, SMF information, the DNN, and the slice information from the SMF network element, to register the SMF network element with the data management network element. The SMF information includes at least one of identification information of the SMF network element and address information of the SMF network element. The processing module 1302 is configured to store the SMF information associated with the DNN and the slice information into context information of the terminal device.

In another embodiment, the receiving module 1301 is configured to receive identification information of a terminal device, SMF information, a data network name DNN, and slice information from a session management function SMF network element that are used to register the SMF network element with the data management network element. The SMF information includes at least one of identification information of the SMF network element and address information of the SMF network element. The processing module 1302 is configured to store the SMF information associated with the DNN and the slice information into context information of the terminal device.

Therefore, when subscription data in a UDM network element is updated, if the updated subscription data is related only to a specific slice, the UDM can notify, based on session context information of UE, the updated subscription data only to an SMF network element corresponding to the DNN and the slice. Therefore, a principle of mutual isolation between slices is met, and signaling and resource waste is avoided.

For either of the two embodiments, optionally, the receiving module 1301 is further configured to receive the identification information of the terminal device, second subscription data, the DNN, and the slice information from the data management network element. The processing module 1302 is configured to update the first subscription data associated with the DNN and the slice information to the second subscription data.

Optionally, the receiving module 1301 is further configured to receive the identification information of the terminal device, the DNN, and the slice information from the data management network element. The processing module 1302 is configured to delete, from the SMF network element, the first subscription data that is of the terminal device and that is associated with the DNN and the slice information.

Optionally, the sending module 1303 is further configured to send the identification information of the terminal device, the DNN, and the slice information to the data management network element, to delete the SMF information associated with the DNN and the slice information.

In addition, the receiving module 1301, the processing module 1302, and the sending module 1303 in the data management network element may further implement another operation or function of the UDM network element 112 in the foregoing methods. Details are not described herein again.

Figure 13B:
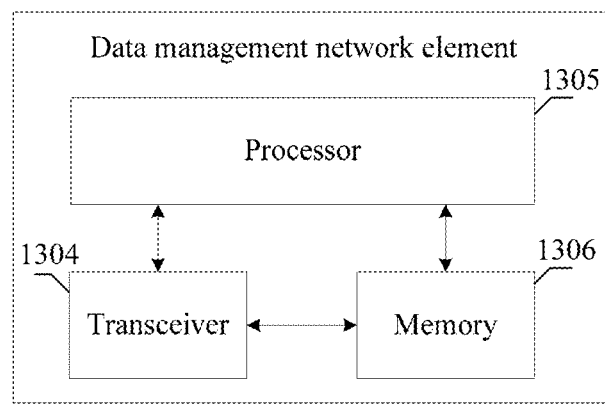

FIG. 13B shows another possible structural schematic diagram of a data management network element in the foregoing embodiment. The data management network element includes a transceiver 1304 and a processor 1305, as shown in FIG. 13B. For example, the processor 1305 is configured to process a function that is of a UDM and that is performed by the data management network element in the foregoing methods. The transceiver 1304 is configured to implement communication between the UDM and an SMF or H-SMF. The data management network element may further include a memory 1306. The memory is configured to be coupled to the processor, and stores a program instruction and data that are necessary for the data management network element.

It may be understood that FIG. 12B and FIG. 13B merely show simplified designs of the foregoing devices. During actual application, each of the foregoing devices may include any quantity of transmitters, receivers, processors, controllers, memories, communications units, or the like, and all devices that can implement this application fall within the protection scope of this application.

The controller/processor configured to perform the session management function network element in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. The processor may be a combination of processors implementing a computing function, for example, a combination of one or more microprocessors, or a combination of a DSP and a microprocessor.

In combination with content disclosed in this application, methods or algorithm steps described may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a session management function network element. Certainly, the processor and the storage medium may exist in the session management function network element as discrete components.

All or some of the foregoing embodiments may be implemented by software, hardware, firmware, or any combination thereof. When the software is used to implement the embodiments, the embodiments may be implemented completely or partially in a form of a computer program product. The computer program product includes one or more computer instructions. When the computer program instruction is loaded and executed on a computer, the procedures or functions according to the embodiments of the present invention are completely or partially generated. The computer may be a general purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, or improvement made based on the technical solutions of this application shall fall within the protection scope of this application.

What is claimed is:

1. A session information management method, comprising:
sending, by a session management function network element, identification information of a terminal device, a data network name (DNN), and slice information to a data management network element to request first subscription data that is of the terminal device and that is associated with the DNN and the slice information, wherein the slice information is used to identify a network slice served by the session management function network element; and
receiving, by the session management function network element, the first subscription data from the data management network element.

2. The method according to claim 1, further comprising:
sending, by the session management function network element, the identification information of the terminal device, session management function information, the DNN, and the slice information to the data management network element to register the session management function network element with the data management network element, wherein the session management function information comprises at least one of identification information of the session management function network element or address information of the session management function network element.

3. The method according to claim 2, further comprising:
receiving, by the session management function network element, the identification information of the terminal device, second subscription data, the DNN, and the slice information from the data management network element; and
updating, by the session management function network element, the first subscription data associated with the DNN and the slice information to the second subscription data.

4. The method according to claim 2, further comprising:
receiving, by the session management function network element, the identification information of the terminal device, the DNN, and the slice information from the data management network element; and
deleting, by the session management function network element from the session management function network element, the first subscription data that is of the terminal device and that is associated with the DNN and the slice information.

5. The method according to claim 2, further comprising:
sending, by the session management function network element, the identification information of the terminal device, the DNN, and the slice information to the data management network element to delete the session management function information associated with the DNN and the slice information.

6. The method according to claim 1, wherein the slice information is used to identify a network slice accessed by the terminal device.

7. The method according to claim 1, wherein the first subscription data comprises a subscribed aggregate maximum bit rate (AMBR) and a session and service continuity (SSC) mode.

8. The method according to claim 7, wherein the first subscription data further comprises a static internet protocol (IP) address or static IP prefix.

9. The method according to claim 7, wherein the first subscription data further comprises at least one of a subscribed quality of service (QoS) profile or a subscribed charging feature.

10. A session management function network element, comprising:
a communications interface;
at least one processor; and
a memory storing computer executable instructions for execution by the at least one processor, wherein the computer executable instructions instruct the session management function network element to:
send identification information of a terminal device, a data network name (DNN), and slice information to a data management network element to request first subscription data that is of the terminal device and that is associated with the DNN and the slice information, wherein the slice information is used to identify a network slice served by the session management function network element; and
receive the first subscription data from the data management network element.

11. The session management function network element according to claim 10, wherein the computer executable instructions instruct the session management function network element to send the identification information of the terminal device, session management function information, the DNN, and the slice information to the data management network element to register the session management function network element with the data management network element, wherein the session management function information comprises at least one of identification information of the session management function network element or address information of the session management function network element.

12. The session management function network element according to claim 10, wherein the slice information is used to identify a network slice accessed by the terminal device.

13. The session management function network element according to claim 10, wherein the first subscription data comprises a subscribed aggregate maximum bit rate (AMBR) and a session and service continuity (SSC) mode.

14. The session management function network element according to claim 13, wherein the first subscription data further comprises a static internet protocol (IP) address or static IP prefix.

15. A data management network element, comprising:
a communications interface;
at least one processor; and
a memory storing computer executable instructions for execution by the at least one processor, wherein the computer executable instructions instruct the data management network element to:
receive identification information of a terminal device, a data network name (DNN), and slice information from a session management function network element that are used to request first subscription data that is of the terminal device and that is associated with the DNN and the slice information, wherein the slice information is used to identify a network slice served by the session management function network element; and
send the first subscription data to the session management function network element.

16. The data management network element according to claim 15, wherein the computer executable instructions instruct the data management network element to:
receive the identification information of the terminal device, session management function information, the DNN, and the slice information from the session management function network element to register the session management function network element with the data management network element, wherein the session management function information comprises at least one of identification information of the session management function network element or address information of the session management function network element; and
store the session management function information associated with the DNN and the slice information into context information of the terminal device.

17. A session information management method, comprising:
receiving, by a data management network element, identification information of a terminal device, a data network name (DNN), and slice information from a session management function network element, wherein the slice information is used to identify a network slice served by the session management function network element; and
sending, by the data management network element, first subscription data that is of the terminal device and that is associated with the DNN and the slice information to the session management function network element.

18. The method according to claim 17, further comprising:
receiving, by the data management network element, the identification information of the terminal device, session management function information, the DNN, and the slice information from the session management function network element to register the session management function network element with the data management network element, wherein the session management function information comprises at least one of identification information of the session management function network element or address information of the session management function network element; and
storing, by the data management network element, the session management function information associated with the DNN and the slice information into context information of the terminal device.

19. The method according to claim 18, further comprising:
updating, by the data management network element, the first subscription data of the terminal device to second subscription data;

determining, by the data management network element, the DNN and the slice information that are associated with the first subscription data; and sending, by the data management network element, the identification information of the terminal device, the DNN, the slice information, and the second subscription data to the session management function network element associated with the DNN and the slice information.

20. The method according to claim 18, further comprising:

deleting, by the data management network element, the first subscription data from the data management network element;

deleting, by the data management network element, the session management function information from the context information of the terminal device; and sending, by the data management network element, the identification information of the terminal device, the DNN, and the slice information to the session management function network element.

21. The method according to claim 18, further comprising:

receiving, by the data management network element, the identification information of the terminal device, the DNN, and the slice information from the session management function network element; and deleting, by the data management network element from the context information of the terminal device, the session management function information associated with the DNN and the slice information.

* * * * *